United States Patent
Chiu et al.

(10) Patent No.: US 6,840,680 B1
(45) Date of Patent: Jan. 11, 2005

(54) RETENTION AND RELEASE MECHANISMS FOR FIBER OPTIC MODULES

(75) Inventors: Liew C. Chiu, Singapore (SG); Ron C. Pang, Singapore (SG); Yong P. Sim, Singapore (SG); Tat M. Teo, Singapore (SG)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/215,965

(22) Filed: Aug. 9, 2002

Related U.S. Application Data

(63) Continuation-in-part of application No. 09/939,403, filed on Aug. 23, 2001, now Pat. No. 6,692,159, which is a continuation-in-part of application No. 09/896,695, filed on Jun. 28, 2001.
(60) Provisional application No. 60/388,162, filed on Jun. 11, 2002, provisional application No. 60/313,232, filed on Aug. 16, 2001, and provisional application No. 60/283,843, filed on Apr. 14, 2001.

(51) Int. Cl.[7] ............................................... G02B 6/36
(52) U.S. Cl. ........................................................ 385/53
(58) Field of Search .............................. 385/53, 88, 89, 385/92, 76, 77, 62, 70, 71; 361/620–760

(56) References Cited

U.S. PATENT DOCUMENTS

| | | |
|---|---|---|
| 1,835,251 A | 12/1931 | Wetstein |
| 1,899,360 A | 2/1933 | Roudebush et al. |
| 2,384,267 A | 9/1945 | Andersen |
| 2,714,195 A | 7/1955 | Beatty |
| 2,760,174 A | 8/1956 | Burtt et al. |
| 2,767,008 A | 10/1956 | Oswald |
| 2,872,139 A | 2/1959 | Bedford, Jr. |
| 2,881,404 A | 4/1959 | Kamm |
| 2,899,669 A | 8/1959 | Johanson |
| 3,017,232 A | 1/1962 | Schwab et al. |
| 3,035,243 A | 5/1962 | Bowling |
| 3,311,863 A | 3/1967 | Beale |

(List continued on next page.)

FOREIGN PATENT DOCUMENTS

| | | |
|---|---|---|
| GB | 2 297 007 A | 7/1996 |
| JP | 07-225327 | 8/1995 |
| JP | 07-225328 | 8/1995 |
| WO | WO 95/12227 | 5/1995 |

OTHER PUBLICATIONS

US 6,554,622, 4/2003, Engel et al. (withdrawn)
Shinichi Sasaki et al., "A Compact Optical Active Connector: An Optical Interconnect Module with an Electrical Connector Interface," IEEE Transactions on Advanced Packaging, vol. 22, No. 4, Nov. 1999.
Nagesh R. Basavanhally et al., "Optoelectronic Packaging," Chapter 2, Communication System Interconnection Structure, pp. 11–23, 38–43, John Wiley & Sons, Inc., New York.

*Primary Examiner*—Robert H. Kim
*Assistant Examiner*—Richard H Kim
(74) *Attorney, Agent, or Firm*—Allen, Dyer, Doppelt, Milbrath & Gilchrist, P.A.

(57) ABSTRACT

A rotate-and-pull mechanism for fiber optic modules. The mechanism having a lever-actuator to unlatch and withdraw a fiber optic module from a cage assembly or a module receptacle. The lever-actuator pivotally couples to the fiber optic module so that when lever-actuator is rotated about its pivot point, the lever-actuator causes a pivot-arm actuator to release the fiber optic module from the cage assembly. The pivot-arm actuator further including a keeper to engage into a latch in the cage assembly. A bracket, which may be coupled to the fiber optic module, provides a flexible arm portion to provide a counteracting force when the pivot-arm actuator rotates to release the fiber optic module from the cage assembly. The bracket may include a slot through which the keeper on the pivot-arm actuator may move through as the pivot-arm actuator pivots.

48 Claims, 18 Drawing Sheets

U.S. PATENT DOCUMENTS

| | | |
|---|---|---|
| 3,398,390 A | 8/1968 | Long |
| 3,408,614 A | 10/1968 | Kuwahata |
| 3,451,034 A | 6/1969 | Beale |
| 3,476,258 A | 11/1969 | Dorsett |
| 3,495,206 A | 2/1970 | Pfister |
| 3,518,612 A | 6/1970 | Dunman et al. |
| 3,566,190 A | 2/1971 | Huebner et al. |
| 3,566,336 A | 2/1971 | Johnson et al. |
| 3,576,515 A | 4/1971 | Frantz |
| 3,594,698 A | 7/1971 | Anhalt |
| 3,668,605 A | 6/1972 | Albert |
| 3,736,471 A | 5/1973 | Donze et al. |
| 3,767,974 A | 10/1973 | Donovan, Jr. et al. |
| 3,784,954 A | 1/1974 | Grimm et al. |
| 3,798,507 A | 3/1974 | Damon et al. |
| 3,803,409 A | 4/1974 | Prochazka |
| 3,806,225 A | 4/1974 | Codrino |
| 3,809,908 A | 5/1974 | Clanton |
| 3,915,538 A | 10/1975 | Gruhn, Jr. et al. |
| 3,950,059 A | 4/1976 | Anhalt et al. |
| 3,951,514 A | 4/1976 | Medina, Jr. |
| 3,952,232 A | 4/1976 | Coules |
| 4,045,109 A | 8/1977 | Langenbach et al. |
| 4,064,551 A | 12/1977 | Lightfoot |
| 4,070,081 A | 1/1978 | Takahashi |
| 4,083,616 A | 4/1978 | McNiece et al. |
| 4,083,619 A | 4/1978 | McCormick et al. |
| 4,084,882 A | 4/1978 | Hogan et al. |
| 4,140,367 A | 2/1979 | Makuch et al. |
| 4,149,072 A | 4/1979 | Smith et al. |
| 4,152,038 A | 5/1979 | Inouye et al. |
| 4,167,303 A | 9/1979 | Bowen et al. |
| 4,197,572 A | 4/1980 | Aimar |
| 4,217,030 A | 8/1980 | Howarth |
| 4,226,491 A | 10/1980 | Kazama et al. |
| 4,233,646 A | 11/1980 | Leung et al. |
| 4,243,283 A | 1/1981 | McSparran |
| 4,260,210 A | 4/1981 | Babuka et al. |
| 4,268,114 A | 5/1981 | dAuria et al. |
| 4,273,413 A | 6/1981 | Bendiksen et al. |
| 4,295,181 A | 10/1981 | Chang et al. |
| 4,301,494 A | 11/1981 | Jordan |
| 4,313,150 A | 1/1982 | Chu |
| 4,377,318 A | 3/1983 | Long |
| 4,384,368 A | 5/1983 | Rosenfeldt et al. |
| 4,387,956 A | 6/1983 | Cline |
| 4,398,073 A | 8/1983 | Botz et al. |
| 4,406,514 A | 9/1983 | Hillegonds et al. |
| 4,410,222 A | 10/1983 | Enomoto et al. |
| 4,427,879 A | 1/1984 | Becher et al. |
| 4,432,604 A | 2/1984 | Schwab |
| 4,439,006 A | 3/1984 | Stevenson |
| 4,445,740 A | 5/1984 | Wallace |
| 4,448,467 A | 5/1984 | Weidler |
| 4,449,784 A | 5/1984 | Basov et al. |
| 4,460,230 A | 7/1984 | McKee et al. |
| 4,470,660 A | 9/1984 | Hillegonds et al. |
| 4,477,133 A | 10/1984 | Cosmo |
| 4,477,146 A | 10/1984 | Bowen et al. |
| 4,491,981 A | 1/1985 | Weller et al. |
| 4,522,463 A | 6/1985 | Schwenda et al. |
| 4,526,427 A | 7/1985 | Boll et al. |
| 4,527,285 A | 7/1985 | Kekas et al. |
| 4,541,036 A | 9/1985 | Landries et al. |
| 4,548,467 A | 10/1985 | Stoerk et al. |
| 4,553,813 A | 11/1985 | McNaughton et al. |
| 4,553,814 A | 11/1985 | Bahl et al. |
| 4,611,887 A | 9/1986 | Glover et al. |
| 4,619,493 A | 10/1986 | Kikuta |
| 4,678,264 A | 7/1987 | Bowen et al. |
| 4,684,210 A | 8/1987 | Matsunaga et al. |
| 4,699,438 A | 10/1987 | Kikuta |
| 4,699,455 A | 10/1987 | Erbe et al. |
| 4,734,049 A | 3/1988 | George et al. |
| 4,737,008 A | 4/1988 | Ohyama et al. |
| 4,756,593 A | 7/1988 | Koakutsu et al. |
| 4,762,388 A | 8/1988 | Tanaka et al. |
| 4,767,179 A | 8/1988 | Sampson et al. |
| 4,779,950 A | 10/1988 | Williams |
| 4,787,706 A | 11/1988 | Cannon, Jr. et al. |
| 4,789,218 A | 12/1988 | Paul et al. |
| 4,798,430 A | 1/1989 | Johnson et al. |
| 4,798,440 A | 1/1989 | Hoffer et al. |
| 4,821,145 A | 4/1989 | Corfits et al. |
| 4,838,810 A | 6/1989 | Yoshimura et al. |
| 4,840,451 A | 6/1989 | Sampson et al. |
| 4,861,134 A | 8/1989 | Alameel et al. |
| 4,872,736 A | 10/1989 | Myers et al. |
| 4,900,263 A | 2/1990 | Manassero et al. |
| 4,906,197 A | 3/1990 | Noll |
| 4,944,568 A | 7/1990 | Danbach et al. |
| 4,960,317 A | 10/1990 | Briggs et al. |
| 4,969,924 A | 11/1990 | Suverison et al. |
| 4,986,625 A | 1/1991 | Yamada et al. |
| 4,991,062 A | 2/1991 | Nguyenngoc |
| 4,995,821 A | 2/1991 | Casey |
| 4,997,386 A | 3/1991 | Kawachi et al. |
| 5,005,939 A | 4/1991 | Arvanitakis et al. |
| 5,011,425 A | 4/1991 | VanZanten et al. |
| 5,013,247 A | 5/1991 | Watson |
| 5,016,968 A | 5/1991 | Hammond et al. |
| 5,021,003 A | 6/1991 | Ohtaka et al. |
| 5,039,194 A | 8/1991 | Block et al. |
| 5,042,891 A | 8/1991 | Mulholland et al. |
| 5,044,982 A | 9/1991 | Bertini |
| 5,062,806 A | 11/1991 | Ohno et al. |
| 5,067,785 A | 11/1991 | Schirbl et al. |
| 5,071,219 A | 12/1991 | Yurtin et al. |
| 5,073,045 A | 12/1991 | Abendschein |
| 5,073,046 A | 12/1991 | Edwards et al. |
| 5,076,656 A | 12/1991 | Briggs et al. |
| 5,082,344 A | 1/1992 | Mulholland et al. |
| 5,083,931 A | 1/1992 | Davidge et al. |
| 5,084,802 A | 1/1992 | Nguyenngoc |
| 5,091,991 A | 2/1992 | Briggs et al. |
| 5,099,307 A | 3/1992 | Go et al. |
| 5,101,463 A | 3/1992 | Cubukciyan et al. |
| 5,104,243 A | 4/1992 | Harding |
| 5,109,453 A | 4/1992 | Edwards et al. |
| 5,113,467 A | 5/1992 | Peterson et al. |
| 5,116,239 A | 5/1992 | Siwinski |
| 5,117,476 A | 5/1992 | Yingst et al. |
| 5,118,904 A | 6/1992 | Nguyenngoc |
| 5,125,849 A | 6/1992 | Briggs et al. |
| 5,134,679 A | 7/1992 | Robin et al. |
| 5,138,678 A | 8/1992 | Briggs et al. |
| 5,140,663 A | 8/1992 | Edwards et al. |
| 5,142,597 A | 8/1992 | Mulholland et al. |
| 5,155,786 A | 10/1992 | Ecker et al. |
| 5,159,652 A | 10/1992 | D'Alphonse et al. |
| 5,163,109 A | 11/1992 | Okugawa et al. |
| 5,163,847 A | 11/1992 | Regnier |
| 5,183,404 A | 2/1993 | Aldous et al. |
| 5,195,897 A | 3/1993 | Kent et al. |
| 5,195,911 A | 3/1993 | Murphy |
| 5,199,093 A | 3/1993 | Longhurst |
| 5,204,929 A | 4/1993 | Machall et al. |
| 5,212,681 A | 5/1993 | Bock et al. |
| 5,212,761 A | 5/1993 | Petrunia |
| 5,218,519 A | 6/1993 | Welch et al. |
| 5,234,353 A | 8/1993 | Scholz et al. |

| | | |
|---|---|---|
| 5,238,426 A | 8/1993 | Arnett |
| 5,243,678 A | 9/1993 | Schaffer et al. |
| 5,247,427 A | 9/1993 | Driscoll et al. |
| 5,253,320 A | 10/1993 | Takahashi et al. |
| 5,256,080 A | 10/1993 | Bright |
| 5,259,052 A | 11/1993 | Briggs et al. |
| 5,262,923 A | 11/1993 | Batta et al. |
| 5,274,729 A | 12/1993 | King et al. |
| 5,283,680 A | 2/1994 | Okugawa et al. |
| 5,286,207 A | 2/1994 | McHugh |
| 5,289,345 A | 2/1994 | Corradetti et al. |
| 5,295,212 A | 3/1994 | Morton et al. |
| 5,315,679 A | 5/1994 | Baldwin et al. |
| 5,317,663 A | 5/1994 | Beard et al. |
| 5,325,454 A | 6/1994 | Rittle et al. |
| 5,325,455 A | 6/1994 | Henson et al. |
| 5,329,428 A | 7/1994 | Block et al. |
| 5,329,604 A | 7/1994 | Baldwin et al. |
| 5,333,221 A | 7/1994 | Briggs et al. |
| 5,337,396 A | 8/1994 | Chen et al. |
| 5,361,318 A | 11/1994 | Go et al. |
| 5,363,465 A | 11/1994 | Korkowski et al. |
| D353,796 S | 12/1994 | Oliver et al. |
| D354,271 S | 1/1995 | Speiser et al. |
| 5,383,793 A | 1/1995 | Hsu et al. |
| 5,386,346 A | 1/1995 | Gleadall |
| 5,390,268 A | 2/1995 | Morlion et al. |
| 5,398,295 A | 3/1995 | Chang et al. |
| 5,411,402 A | 5/1995 | Bethurum |
| 5,412,497 A | 5/1995 | Kaetsu et al. |
| 5,425,646 A | 6/1995 | Green |
| 5,442,726 A | 8/1995 | Howard et al. |
| 5,452,388 A | 9/1995 | Rittle et al. |
| 5,463,532 A | 10/1995 | Petitpierre et al. |
| 5,469,526 A | 11/1995 | Rawlings |
| 5,470,238 A | 11/1995 | Walden |
| 5,481,634 A | 1/1996 | Anderson et al. |
| 5,487,678 A | 1/1996 | Tsuji et al. |
| 5,491,613 A | 2/1996 | Petitpierre |
| 5,515,468 A | 5/1996 | DeAndrea et al. |
| 5,528,408 A | 6/1996 | McGinley et al. |
| 5,546,281 A | 8/1996 | Poplawski et al. |
| 5,548,677 A | 8/1996 | Kakii et al. |
| 5,561,727 A | 10/1996 | Akita et al. |
| 5,583,745 A | 12/1996 | Uwabo et al. |
| 5,596,663 A | 1/1997 | Ishibashi et al. |
| 5,600,470 A | 2/1997 | Walsh |
| 5,604,831 A | 2/1997 | Dittman et al. |
| 5,654,873 A | 8/1997 | Smithson et al. |
| 5,659,459 A | 8/1997 | Wakabayashi et al. |
| D389,802 S | 1/1998 | Vernon |
| 5,717,533 A | 2/1998 | Poplawski et al. |
| 5,734,558 A | 3/1998 | Poplawski et al. |
| 5,738,538 A | 4/1998 | Bruch et al. |
| 5,757,998 A | 5/1998 | Thatcher et al. |
| 5,766,027 A | 6/1998 | Fogg |
| 5,767,999 A | 6/1998 | Kayner |
| 5,797,771 A | 8/1998 | Garside |
| 5,820,398 A | 10/1998 | Stabroth et al. |
| 5,829,996 A | 11/1998 | Yamane et al. |
| 5,864,468 A | 1/1999 | Poplawski et al. |
| 5,865,646 A | 2/1999 | Ortega et al. |
| 5,879,173 A * | 3/1999 | Poplawski et al. .......... 439/138 |
| 5,896,480 A | 4/1999 | Scharf et al. |
| 5,901,263 A | 5/1999 | Gaio et al. |
| 5,931,290 A | 8/1999 | Wehrli, III et al. |
| 5,966,487 A | 10/1999 | Gilliland et al. |
| 5,980,324 A | 11/1999 | Berg et al. |
| 6,047,172 A | 4/2000 | Babineau et al. |
| 6,052,278 A | 4/2000 | Tanzer et al. |
| 6,062,893 A | 5/2000 | Miskin et al. |
| 6,074,228 A | 6/2000 | Berg et al. |
| 6,085,006 A | 7/2000 | Gaio et al. |
| RE36,820 E | 8/2000 | McGinley et al. |
| 6,101,087 A | 8/2000 | Sutton et al. |
| 6,142,802 A | 11/2000 | Berg et al. |
| 6,142,828 A | 11/2000 | Pepe |
| 6,149,465 A | 11/2000 | Berg et al. |
| 6,178,096 B1 | 1/2001 | Flickinger et al. |
| 6,179,627 B1 | 1/2001 | Daly et al. |
| 6,186,670 B1 | 2/2001 | Austin et al. |
| 6,190,054 B1 | 2/2001 | Tamaki et al. |
| 6,200,041 B1 | 3/2001 | Gaio et al. |
| 6,201,704 B1 | 3/2001 | Poplawski et al. |
| 6,203,333 B1 | 3/2001 | Medina et al. |
| 6,206,582 B1 | 3/2001 | Gilliland |
| 6,220,873 B1 | 4/2001 | Samela et al. |
| 6,220,878 B1 | 4/2001 | Poplawski et al. |
| 6,226,188 B1 | 5/2001 | Warren |
| 6,229,708 B1 | 5/2001 | Corbin, Jr. et al. |
| 6,231,145 B1 | 5/2001 | Liu |
| 6,241,534 B1 | 6/2001 | Neer et al. |
| 6,267,606 B1 | 7/2001 | Poplawski et al. |
| D446,501 S | 8/2001 | Donnell et al. |
| 6,276,943 B1 | 8/2001 | Boutros et al. |
| 6,304,436 B1 | 10/2001 | Branch et al. |
| 6,317,329 B1 | 11/2001 | Dowdy et al. |
| 6,335,869 B1 | 1/2002 | Branch et al. |
| 6,341,899 B1 | 1/2002 | Shirakawa et al. |
| 6,350,063 B1 | 2/2002 | Gilliland et al. |
| 6,358,082 B1 | 3/2002 | Letourneau |
| 6,364,540 B2 | 4/2002 | Shishikura et al. |
| 6,364,709 B1 | 4/2002 | Jones |
| 6,369,924 B1 | 4/2002 | Scharf et al. |
| 6,371,787 B1 | 4/2002 | Branch et al. |
| 6,406,317 B1 | 6/2002 | Li et al. |
| 6,416,361 B1 | 7/2002 | Hwang |
| 6,422,763 B1 | 7/2002 | Halbach et al. |
| 6,430,053 B1 | 8/2002 | Peterson et al. |
| 6,431,901 B1 | 8/2002 | Yeh |
| 6,431,902 B1 | 8/2002 | Yeh |
| 6,434,015 B1 | 8/2002 | Hwang |
| 6,439,918 B1 | 8/2002 | Togami et al. |
| 6,485,322 B1 | 11/2002 | Branch et al. |
| 6,494,623 B1 | 12/2002 | Ahrens et al. |
| 6,517,382 B2 | 2/2003 | Flickinger et al. |
| 6,519,160 B1 | 2/2003 | Branch et al. |
| 6,524,134 B2 | 2/2003 | Flickinger et al. |
| 6,530,785 B1 | 3/2003 | Hwang |
| 6,532,155 B2 | 3/2003 | Green et al. |
| 6,533,603 B1 | 3/2003 | Togami |
| 6,556,445 B2 | 4/2003 | Medina |
| 6,570,768 B2 | 5/2003 | Medina |
| 6,692,159 B2 | 2/2004 | Chiu et al. |
| 2002/0093796 A1 | 7/2002 | Medina |
| 2002/0167793 A1 | 11/2002 | Branch et al. |
| 2003/0007738 A1 | 1/2003 | Cairns et al. |

\* cited by examiner

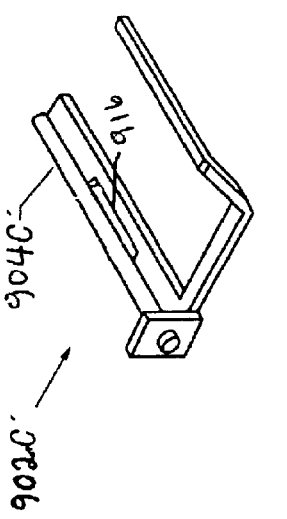
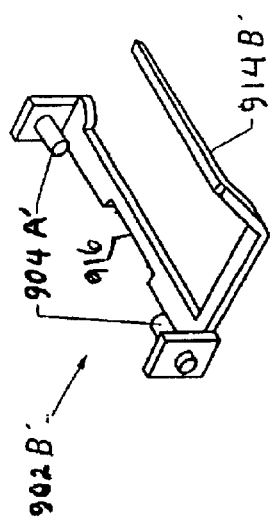
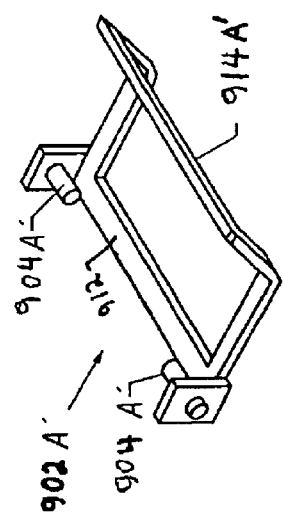
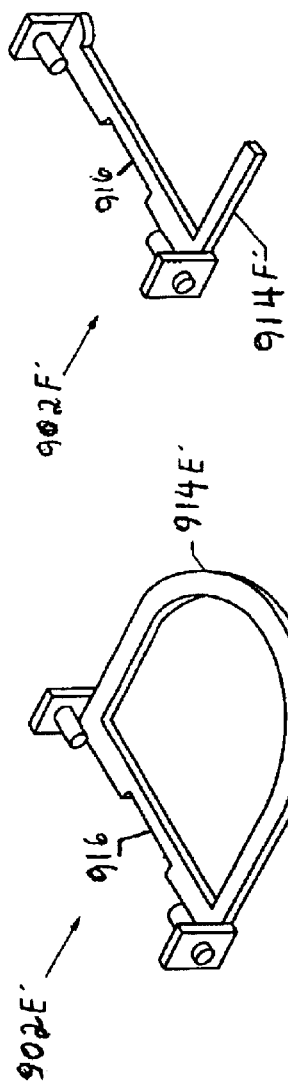
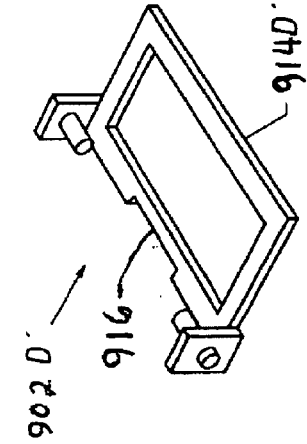
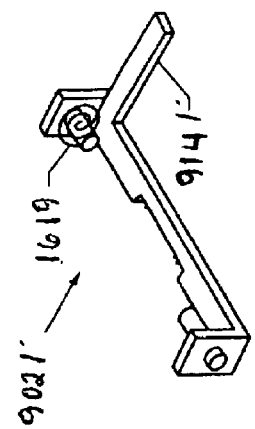
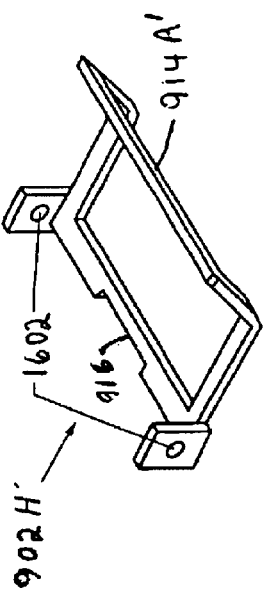
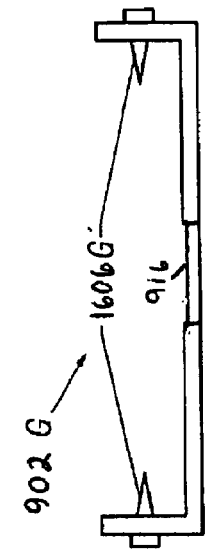

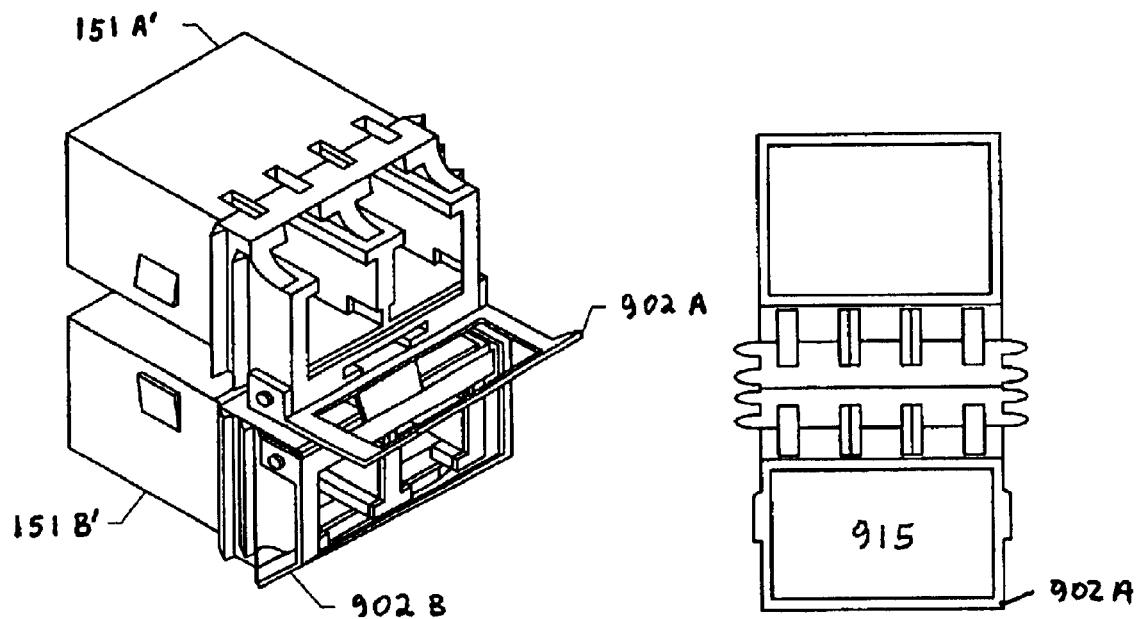
FIG. 18A
FIG. 18B
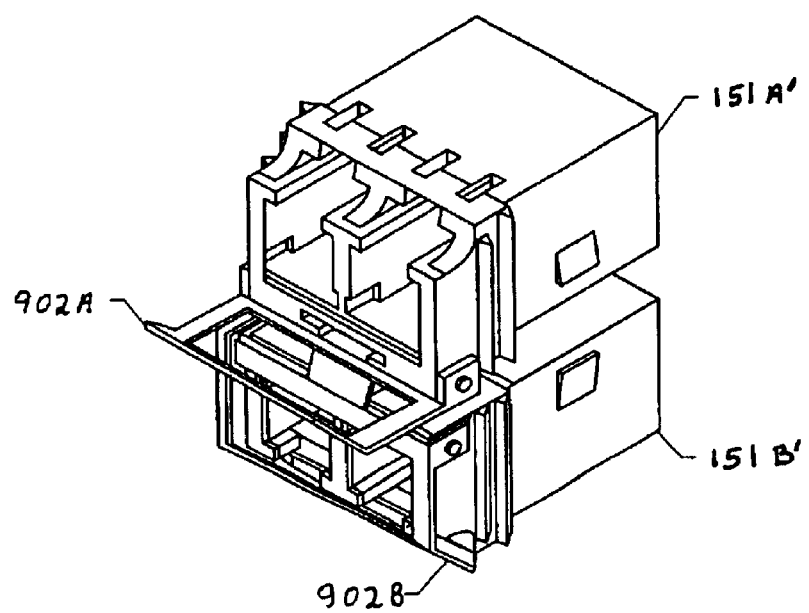
FIG. 18C

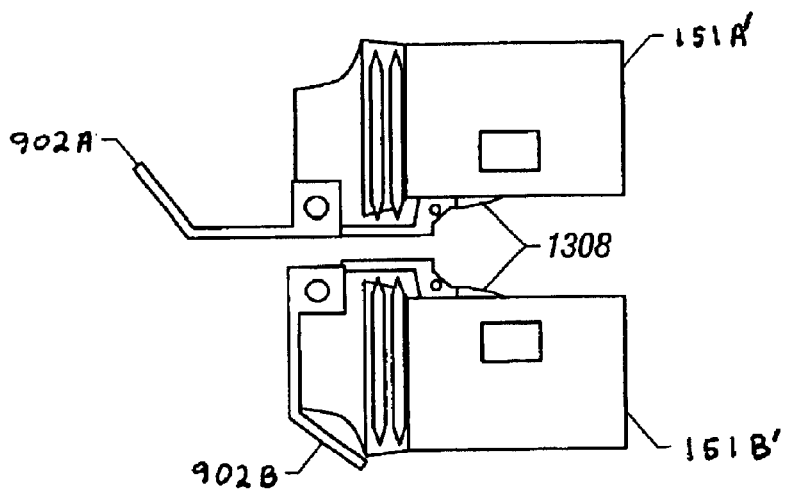
FIG. 18D
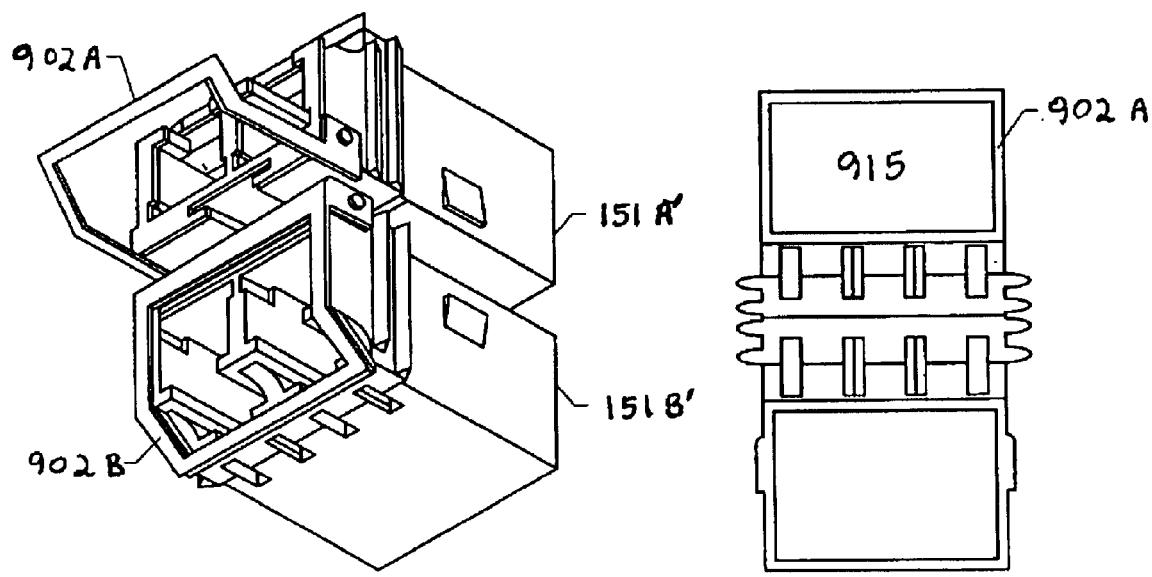
FIG. 18E  FIG. 18F

RETENTION AND RELEASE MECHANISMS FOR FIBER OPTIC MODULES

CROSS REFERENCE TO RELATED APPLICATIONS

This United States (U.S.) patent application is a continuation in part of U.S. application Ser. No. 09/939,403 filed on Aug. 23, 2001 now U.S. Pat. No. 6,692,159 by inventors Liew Chuang Chiu et al., titled "DE-LATCHING MECHANISMS FOR FIBER OPTIC MODULES"; and also claims the benefit of U.S. Provisional Application No. 60/388,162 filed on Jun. 11, 2002, by inventors Liew Chuang Chiu et al., titled "RETENTION AND WITHDRAWAL MECHANISMS FOR FIBER OPTIC MODULES"; and also claims the benefit of U.S. Provisional Application No. 60/313,232 filed on Aug. 16, 2001 by inventors Liew Chuang Chiu et al., titled "DE-LATCHING MECHANISMS FOR FIBER OPTIC MODULES"; and also claims the benefit of and is a continuation in part (CIP) of U.S. patent application Ser. No. 09/896,695, filed on Jun. 28, 2001 by inventors Liew Chuang Chiu et al., titled "METHOD AND APPARATUS FOR PUSH BUTTON RELEASE FIBER OPTIC MODULES" which claims the benefit of U.S. Provisional Application No. 60/283,843 filed on Apr. 14, 2001 by inventors Liew Chuang Chiu et al. entitled "METHOD AND APPARATUS FOR PUSH BUTTON RELEASE FIBER OPTIC MODULES"; and is also related to U.S. patent application Ser. No. 09/939,413, filed on Aug. 23, 2001 by Liew C. Chiu et al., titled "PULL-ACTION DE-LATCHING MECHANISMS FOR FIBER OPTIC MODULES"; U.S. patent application Ser. No. 09/656,779, filed on Sep. 7, 2000 by Cheng Ping Wei et al.; and U.S. patent application Ser. No. 09/321,308, filed on May 27, 1999 by Wenbin Jiang et al.; all of which are to be assigned to E2O Communications, Inc.

FIELD

This invention relates generally to fiber optic modules. More particularly, the invention relates to retention and release mechanisms for unplugging fiber optic modules.

BACKGROUND

Fiber optic modules can transduce electrical data signals in order to transmit optical signals over optical fibers. Fiber optic modules can also transduce optical signals received over optical fibers into electrical data signals.

The size or form factor of fiber optic modules is is important. The smaller the form factor of a fiber optic module, the less space taken on a printed circuit board to which it couples. A smaller form factor allows a greater number of fiber optic modules to be coupled onto a printed circuit board to support additional communication channels. However, the smaller form factor makes it more difficult for a user to handle.

When a fiber optic module embedded in a system fails it is desirable to replace it, particularly when other communication channels are supported by other operating fiber optic modules. To replace a failed fiber optic module it needs to be pluggable into a module receptacle. While plugging in a new fiber optic module is usually easy, it is more difficult to remove the failed fiber optic module because of other components surrounding it. Additionally, a user should not attempt to pull on fiber optic cables in order to try and remove a failed fiber optic module or else the user might cause damage thereto.

A typical release method for a pluggable fiber optic module is to push in on the fiber optic module itself and then pull out on the fiber optic module to release it from a cage assembly or module receptacle. It has been determined that this method is not very reliable with users complaining of the difficulty in removing pluggable fiber optic modules in this manner.

Users often complain that traditional methods offer little leverage in getting a sufficient grip on the module when attempting to pull it out of a module receptacle. Another complaint is that traditional actuators used to remove fiber optic modules are inaccessible or invisible. Other users complain that once released by the traditional method, it is difficult to withdraw the fiber optic module out of its cage or module receptacle.

Additionally, the pushing and then pulling of traditional methods places extra strain on components of the fiber optic module itself, the cage assembly or module receptacle and any electrical connections which the fiber optic module makes with an electrical connector. Oftentimes more than one cycle of pushing and pulling on the fiber optic module is required to release it from the cage or receptacle.

It is desirable to make it easier to remove pluggable fiber optic modules.

BRIEF DESCRIPTIONS OF THE DRAWINGS

FIGS. 16A–16I illustrate various views of an alternate embodiments of the lever.

FIGS. 18A–18I illustrate various views of how the MT bail-lever delatching mechanism would function in a belly-to-belly mounting configuration for another embodiment of the invention.

DETAILED DESCRIPTION

In the following detailed description of the invention, numerous specific details are set forth in order to provide a thorough understanding of the invention. However, one skilled in the art would recognize that the invention may be practiced without these specific details. In other instances well known methods, procedures, components, and circuits have not been described in detail so as not to unnecessarily obscure aspects of the invention.

In the following description, certain terminology is used to describe various features of the invention. For example, a "fiber-optic transceiver" is a fiber optic module having optical signal transmit and receive capability. The terms "disengage", "release", "unlatch", and "de-latch" may is be used interchangeably when referring to the de-coupling of a fiber optic module from a cage assembly.

The invention includes methods, apparatuses and systems for fiber optic modules including pull-action releasable fiber optic modules in small form pluggable (SFP) GBIC, LC type packages.

Figure 1:
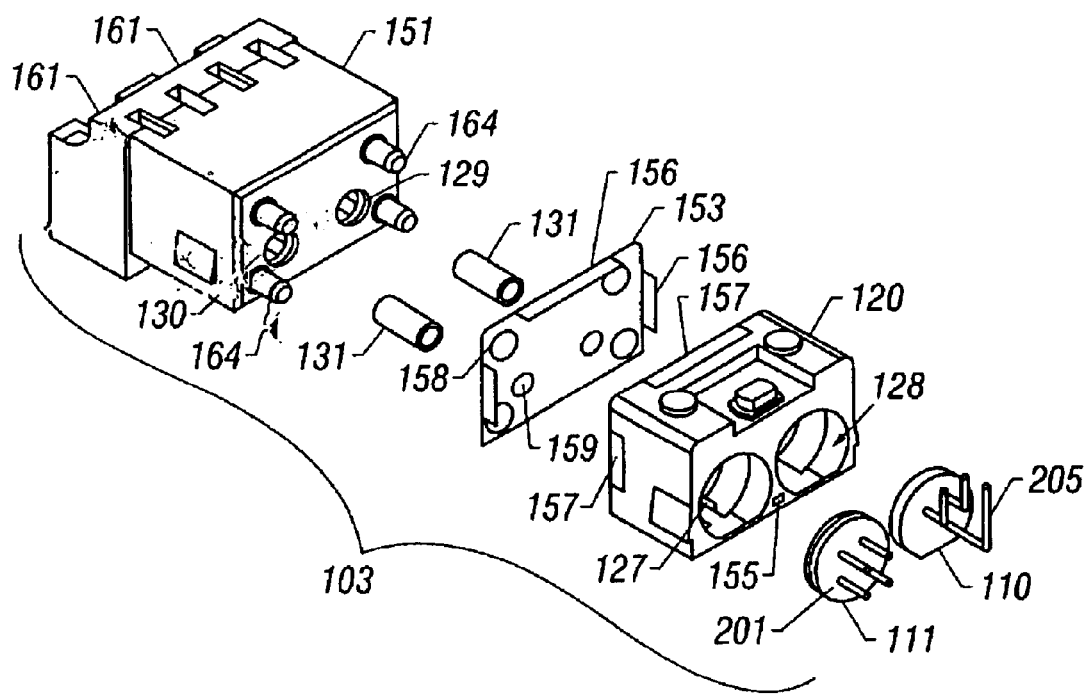
FIG. 1 is a simplified top—exploded view illustrating an optical element.

Referring now to FIG. 1, an exploded view of an optical element 103 of an embodiment of the invention is illustrated. The optical element 103 included a nose 151, a pair of fiber ferrule sleeves 131, an electromagnetic interference (EMI) shield plate 153, an optical block 120, a receiver 111 and a transmitter 110. The electromagnetic interference shield plate 153 provides shielding to keep electromagnetic interference from leaking into or out of the optical block 120 and the module. The optical block 120 aligns a light transmitter 110 and a light receiver 111 with two lenses in the optical block 120. The light transmitters 110 or light receivers 111 are optoelectronic devices for communicating with optical fibers using light of various wavelengths or photons. An optoelectronic device is a device which can convert or transduce light or photons into an electrical signal or an electrical signal into light or photons. In the case of transmitters, the light transmitters 110 are packaged emitters that can convert electrical signals into light or photons. Examples of emitters are semiconductor lasers (i.e. a VCSEL) or an LED which may be packaged in TO (transistor outline) cans. In the case of receivers, the light receivers 111 are packaged photodetectors, that detect or receive light or photons and convert it into an electrical signal. An example of a photo detector is a photo diode which may be packaged in a TO can. However other packages, housings or optoelectronic devices for receiving and transmitting light or photons may be used for the light transmitters 110 or light receivers 111.

The electromagnetic interference plate 153 has one or more projections 156 which engage one or more external notches 157 of the optical block 120 near its edges. The optical ports 159 of the electromagnetic interference plate 153 align with a pair of optical ports 129 and 130 of the nose 151. The electromagnetic interference plate 153 is electrically coupled to an outer housing 400 (shown on FIG. 5) via the projections 156 and shunts electro—magnetic fields to the outer housing 400. The fiber ferules 131 can be inserted into the optical ports 129 and 130 upon assembly. The nose 151 further has one or more posts 164 over which one or more holes 158 in the electromagnetic interference plate 153 can slide in order to align the nose 151, the pair of fiber ferules 131, the electromagnetic interference plate 153 and the optical block 120 together.

The nose 151 has a pair of LC receptacles 161 for mechanically coupling and aligning a pair of fiber optic cables (not shown) into the fiber optic module 100. Each LC receptacle 161 is a fiber optic receptacle for one serial fiber optic channel. The LC receptacles 161 in the nose 151 are preferably located without spacing between each other. Neighboring channels are separated far enough apart that a fiber optic module 100 having multiple channels can comply with FDA and IEC Class—1 eye safety limits. This eases handling of the fiber optic module 100 by avoiding the use of eye protection.

Due to the size of LC receptacles, TO-can size packages are usable which allows the output power level of each individual fiber optic channel to be separately monitored. Monitoring a fiber optic channel involves splitting the light beam so that a photodetector or photodiode receives a portion of the light beam. The electrical output of the photodiode is then measured to indicate the output power level of the fiber optic channel. The relaxed spacing of the individual fiber optic receptacles of the invention facilitate placing light beam splitters within the TO can of the light transmitter 110. The light beam splitter splits the beam such that a portion of the light beam lands on a photodiode within the TO can. The photodiode's output is measured to monitor the output power of the transmitter. Thus, with each channel being separately monitored for power output, each channel can be individually optimized. Those skilled in the art will also recognize that other fiber optic connectors such as, but not limited to, SC, MT—RJ, VF45, and MU connectors, may be used in lieu of the LC receptacles 161.

Figure 2:
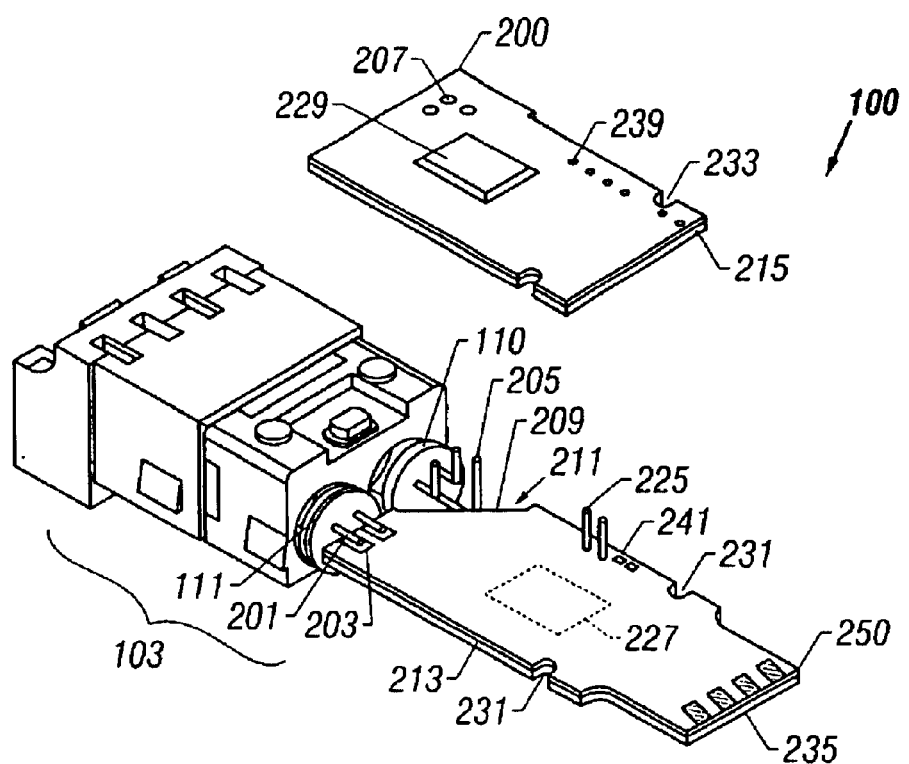
FIG. 2 is a partially assembled view of an optical element, receiver printed circuit board, and transmitter printed circuit board.

Referring now to FIG. 2, a partially assembled view of an optical element 103, a receiver printed circuit board 250, and a transmitter printed circuit board 200 for an embodiment of the invention is illustrated. Receiver printed circuit board 250 includes one or more receiver electrical components 227 (receiver integrated circuit (transimpedance amplifier and post amplifier), resistors, capacitors and other passive or active electrical components), a male electrical connector 235, and a receiver ground plane 213 (not shown). The transmitter printed circuit board 200 includes one or more transmitter electrical components 229 (transmitter integrated circuit (laser driver), resistors, capacitors and other passive or active electrical components) and a transmitter ground plane 215 (not shown). The receiver printed circuit board 250 and the transmitter printed circuit board 200 may be assembled by wave soldering.

At least one pin of the male electrical connector 235 couples to an external female electrical connector. The external female electrical connectors may be SFP (Small Form Pluggable) SMT (Surface Mount Technology) connectors. One or more pins of the male electrical connector 235 allow electrical signals, power, and ground to be coupled into or out of the fiber optic module 100.

Figure 3:
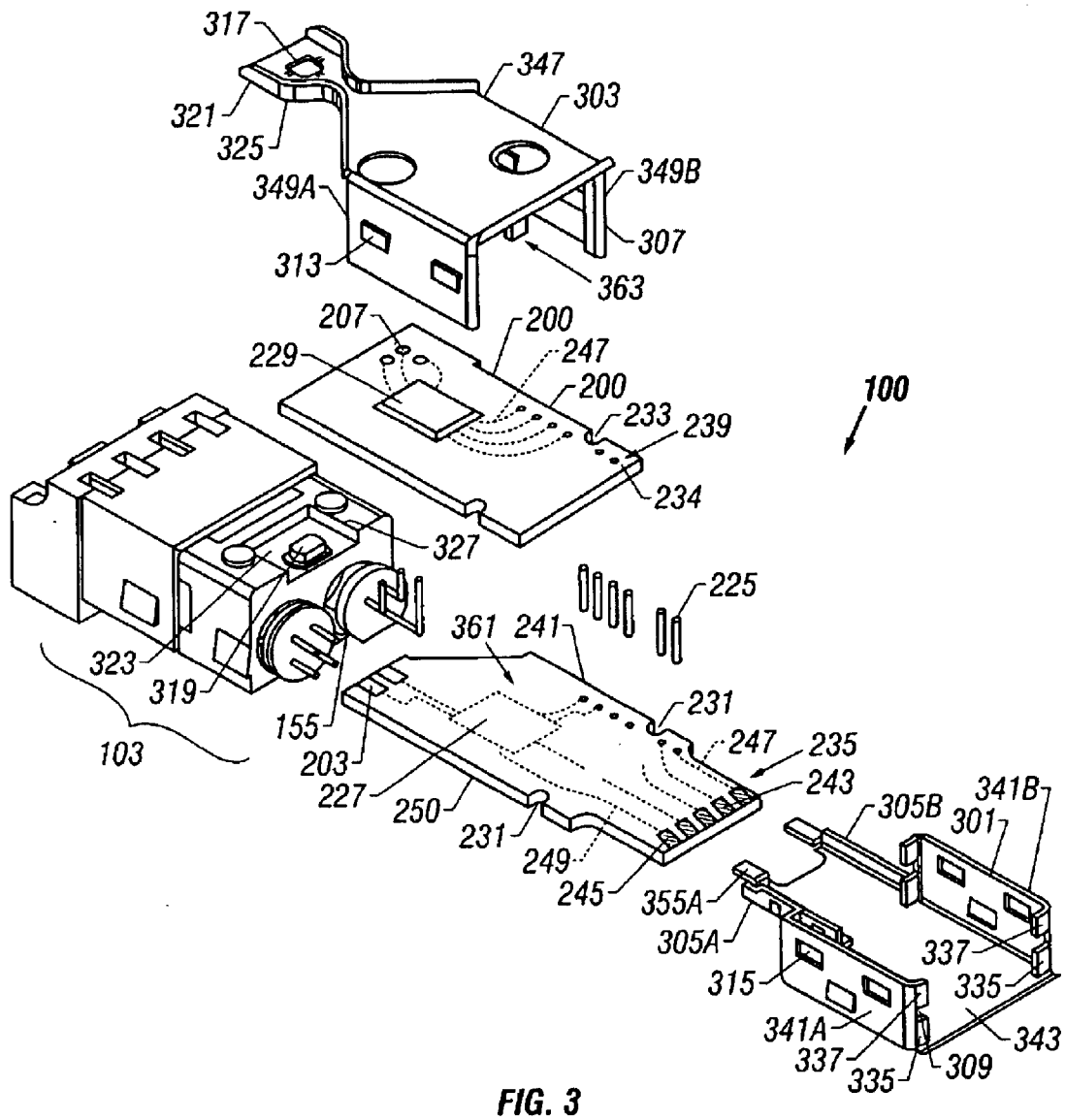
FIG. 3 is an exploded view of a printed circuit board cage subassembly and optical element.

Referring now to FIG. 3, an exploded view of the optical element 103, the receiver printed circuit board 250, the transmitter printed circuit board 200, a bottom frame 301, and a top frame 303 is illustrated. One or more transmitter pins 243 of the male electrical connector 235 which couple to the transmitter electrical components 229, the transmitter electrical components 229, the light transmitter 110, the interconnect leads 225 and a lens (not shown) of the optical block form one transmitting channel. The transmitter electrical components 229 control the light transmitter 110 and buffer the data signal received from a system for transmission over an optical fiber. One or more receiver pins 245 of the male electrical connector 235 which couple to the receiver electrical components 227, the receiver electrical components 227, the light receiver 111 and a lens (not shown) of the optical block form one receiving channel. The receiver electrical components 227 control the light receiver 111 and buffer the data signal received from an optical fiber. Other combinations of components can form other combinations of communications channels.

The optical element 103 includes the light receiver 111 with a plurality of straddle mount signal leads 201. The Straddle mount signal leads 201 are arranged in two horizontal rows to straddle a printed circuit board. The two rows of straddle mount signal leads 201 sandwich the receiver printed circuit board 250 so that the straddle mount signal leads 201 electrically couple the light receiver 111 to a plurality of receiver contacts 203 on both sides of the receiver printed circuit board 250. To improve the coupling between the straddle mount signal lead 201 and the receiver contacts 203, solder may be applied to the straddle mount signal leads 201 and the receiver contacts 203. The receiver contacts 203 are preferably a metal such as copper, silver, gold or other metal or alloy. The receiver contacts 203 may be on one or both the top and bottom surfaces of the receiver printed circuit board 250.

Optical element 103 has a light transmitter 110 with a plurality of formed (i.e. bent) signal leads 205. Each formed signal lead 205 is bent and turned up to couple to a header signal via 207, in the printed circuit board. The printed circuit board 250 has a cutout 209 that allows space for a horizontal portion of the formed signal lead 205. The cutout 209 may be at an angle cutting out a corner of receiver printed circuit board 250. In the alternative, the cutout 209 may be a square, semicircle, quarter circle or other shape. The vertical portion of each formed signal lead 205 is long enough to couple the light transmitter 110 to the transmitter printed circuit board 200.

The ends of formed signal leads 205 couple to a plurality of vias 207, through-holes, contacts or other coupling devices on the transmitter printed circuit board 200. To improve the coupling between a formed signal lead 205 and a via 207, solder may be applied to the formed signal lead 205 and the via 207. Since the printed circuit board assemblies and optical elements are mechanically coupled after the printed circuit boards have been wave soldered, the optical elements are not subject to the heat generated by wave soldering. While a 90 degree angle has been described, it is understood that other arrangements of the formed signal leads 205 may be employed to couple the light transmitter 110 to the transmitter printed circuit board 200.

When assembled into the fiber optic module, the receiver printed circuit board 250 and the transmitter printed circuit board 200 are vertically stacked and substantially parallel to each other. The top frame 303 and the bottom frame 301 hold the receiver printed circuit board 250 and the transmitter printed circuit board 200 in fixed vertical and horizontal alignment.

The fiber optic module further includes one or more interconnect leads 225 which electrically couple the transmitter electrical components 229 on the transmitter printed circuit board 200 to transmitter pins 243 of the electrical connector by means of signal traces in the receiver printed circuit board 250.

The receiver printed circuit board 250 includes a receiver ground plane 213 (shown in FIG. 2), and the transmitter printed circuit board 200 includes a transmitter ground plane 215 (shown in FIG. 2). Receiver ground plane 213 shunts electro-magnetic fields radiating into it to ground via a pin in the male electrical connector 235. The transmitter ground plane 215 shunts electro-magnetic fields radiating into ground through one or more of the interconnect leads 225, a transmitter trace 247 on the receiver printed circuit board 250, and a pin 243 in the male electrical connector 235.

The receiver printed circuit board 250 includes a pair of slots 231 (referred to as receiver slots 231) one in the left side edge and another in the right side edge of the printed circuit board as shown and illustrated in FIG. 2. The transmitter printed circuit board 200 includes a pair of slots 233 (referred to as transmitter slots 233) one in the left side edge and another in the right side edge of the printed circuit board as shown and illustrated in FIG. 2. The receiver slots 231 and the transmitter slots 233 facilitate alignment between the receiver printed circuit board 250 and the transmitter printed circuit board 200.

The bottom frame 301 includes a pair of sides 341A and 341B, a base 343, a pair of rails 305A and 305B, a plurality of lower support tabs 335 and a plurality of upper support tabs 337 extending from a pair of corners of each of the sides 341A and 341B as illustrated in FIG. 3. The base 343 of the bottom frame 301 is L shaped such that the rail 305B extends along the side and base of the bottom frame 301 while the rail 305B extends out of a center line (near the middle of the bottom frame) with a surface of the base there-between. The L shape leaves a cutout area from the base of the bottom frame which will be filled in by a bottom cover as described below. The rail 305A extending from the center line or middle of the bottom frame 301, includes a tip 355A that extends outward and is inserted into an opening 155 in the optical block 120.

The top frame 303 includes a top 347, a pair of top frame sides 349A and 349B, a pair of alignment rails 307, and a flange 321 as shown and illustrated in FIG. 3.

When assembled, the receiver printed circuit board 250 is inserted into a pair of slots 309 between the upper support tabs and the lower support tabs and rests on the lower support tabs 335 of the bottom frame 301. A pair of receiver slots 231 in edges of the receiver printed circuit board 250 are located near corners of the sides 341A and 341B of the receiver printed circuit board. The four lower support tabs 335 and the four upper support tabs 337 restrict vertical movement in the receiver printed circuit board 250 when its engaged thereto. One or more of the elements of the bottom frame 301 may be formed of a conductive material such as a metal or formed to include a conductive plating or surface. The conductive material of the bottom frame 301 shunts electro-magnetic fields to ground via an electrical coupling to chassis ground. In this manner the bottom frame 301 can provide electromagnetic interference shielding for the fiber optic module.

When assembled, the transmitter printed circuit board 200 rests on the four upper support tabs 337 of the bottom frame 301 such that the pair of transmitter slots 233 in the transmitter printed circuit board 200 are aligned directly above the pair of receiver slots 231 in the receiver printed circuit board 250 at a position adjacent to and above the upper support tabs 337. The alignment of the slots 233 with the slots 231 in each of the respective printed circuit boards assures that the transmitter interconnect vias 239 align with the receiver interconnect vias 241 such that the one or more interconnect leads 225 can be coupled there-between. The one or more interconnect leads 225 couple the respective transmitter traces 247 in the transmitter printed circuit board 200 and the receiver printed circuit board 250 together. The interconnect leads 225 are soldered to the receiver printed circuit board 250 at the receiver interconnect vias 241 on one end and to the transmitter printed circuit board 200 at the transmitter interconnect vias 239 at an opposite end. Though the interconnect leads 225 have been described as providing electrical coupling between the receiver printed circuit board 250 and the transmitter printed circuit board 200, it is understood that other interconnect devices may be employed including ribbon cable, wires, male and female electrical connectors and the like.

The pair of top frame sides 349A and 349B of the top frame 303 engage with the bottom frame sides 341A and 3412 of the bottom frame 301 respectively when they are assembled together. When assembled, external faces of the top frame sides 349 abut inside faces of bottom frame sides 341. Each of the top frame sides have a pair of locking tabs 313 which engage with a pair of lock tab apertures 315 in each of the bottom frame sides 341 to hold them together. The locking tabs 313 and the locking tab apertures 315 prevent the bottom frame 301 and the top frame 303 from moving vertically relative to each other. Each vertical edge of the top frame sides 349A and 349B mates with the upper tabs 337 and the lower tabs 335 to keep the top frame 303 from moving laterally relative to the bottom frame 301. The top frame 303 has the pair of alignment rails 307 on edges of the top frame sides 349A and 349B. The alignment rails 307 mate with the pair of transmitter slots 233 in the transmitter printed circuit board 200 and the pair of the receiver slots 231 in the receiver printed circuit board 250 to keep them in alignment so that the interconnect leads 225 are not sheared by movement in either and the electrical coupling is maintained. Top frame 303 has a tab 363, rib, post or other member on the underside of top 347. When top frame 303 is assembled to the bottom frame 301 and transmitter board 200, the tab 363 prevents upward movement of transmitter printed circuit board 200. Additionally, the pair of alignment rails 307 abut a pair of lower support tabs 335 and a pair of upper support tabs 337 to maintain alignment and avoid movement as stress is placed on the receiver printed circuit board 250 when the fiber optic module is pulled away from a connector. The top frame 303 includes the flange 321 which extends from the top 347 of the top frame 303 as shown and illustrated in FIG. 3. The flange 321 includes an opening 317 which slides over a top post 319 of the optical block 120 of the optical element 103. When the opening 317 of the flange 321 is mated with the top post 319, the top frame 303 is tightly coupled to the optical element 103 to avoid separation when the fiber optic module is inserted or removed from a connector. With the opening 317 engaged to the top post 319 so that the top frame is tightly coupled, the alignment rails 307 of the top frame 303 in conjunction with the receiver slots 231 and the transmitter slots 233, keep the receiver printed circuit board 250 and the transmitter printed circuit board 200 tightly coupled to the optical element 103 as well to avoid separation. The flange 321 includes a flange lip 325 that abuts a recess wall 327 of the optical block 120 to prevent lateral movement of the top frame 303 relative to the optical elements 103.

The top frame 303 includes a pair of top frame sides 349A and 349B and the top 347. These and other elements of the top frame may be formed of a conductive material such as a metal or formed to include a conductive plating or surface. The conductive material of the top frame 303 shunts electromagnetic fields to ground via an electrical coupling to chassis ground. In this manner, the top frame 303 provides electromagnetic interference shielding to the fiber optic module.

The assembled subassembly including the receiver printed circuit board 250, the transmitter printed circuit board 200, the interconnect leads 225, the bottom frame 301 and the top frame 303 can hereinafter be referred to as a printed circuit board assembly 411.

Figure 4A:
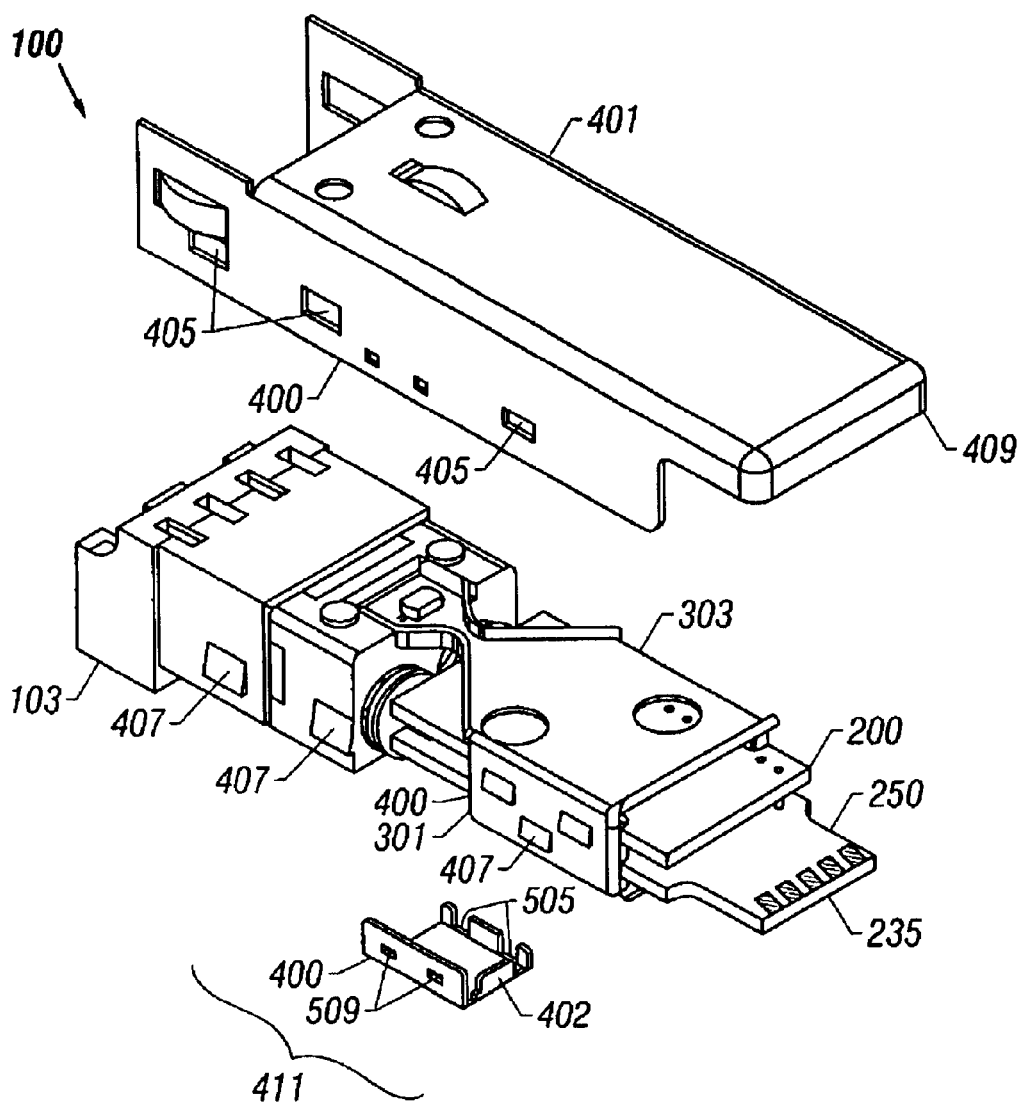
FIG. 4A is an exploded view from the rear of an embodiment of a hot pluggable fiber optic module.

Referring now to FIG. 4A, an exploded view of an outer housing 400 and the printed circuit board assembly 411 is illustrated. The outer housing 400 includes a top cover 401, a bottom cover 402 and the L shaped bottom frame 301. The top cover 401, the bottom cover 402 and the bottom frame 301 couple together and around the optical block 120 to encase the receiver and transmitter printed circuit boards but for one end where the extension in the receiver printed circuit board forms the male connector 235. The top cover 401 includes a top portion and a pair of sides that fit over the printed circuit board assembly 411 and the optical element 103. The top cover 401 includes a plurality of locating tab openings 405 in each of its sides to engage with locating tabs 407 in sides of the optical block 120, in the nose of optical element 103, and in the bottom frame 301. When the locating tab openings 405 are engaged with the locating tabs 407, movement of the top cover 401 relative to the optical element 103 is prohibited. The top cover 401 includes a hood.409 which encloses an end of the transmitter printed circuit board 200 but leaves the connector 235 of the receiver printed circuit board 250 exposed to connect to a connector. The male electrical connector 235 extends from the top cover 401 to mechanically and electrically couple to an external female electrical connector.

The bottom cover 402 is of sufficient size to fill into the cutaway area in the L shaped bottom frame 301. The bottom cover 402 couples to the bottom frame 301 on one side and the top cover 401 on an opposite side.

Figure 4B:
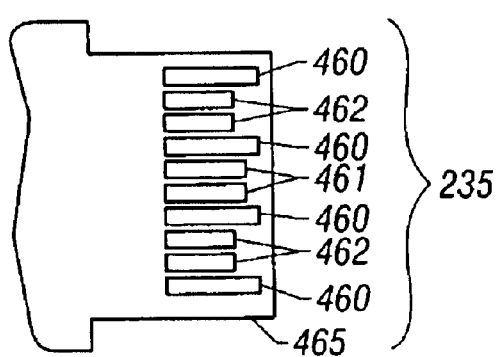
FIG. 4B is a magnified view of a side of a male electrical connector to provide hot pluggability.
Figure 4C:
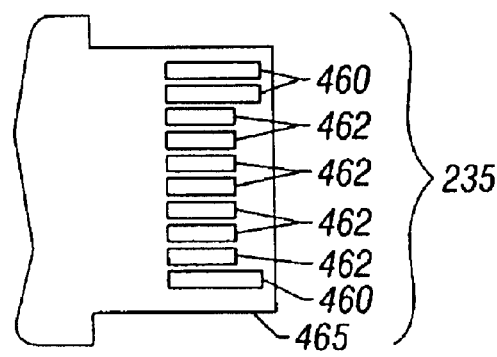
FIG. 4C is a magnified view of another side of the male electrical connector to provide hot pluggability.

Referring now to FIGS. 4B and 4C, pins of the male electrical connector 235 are illustrated in detail to provide hot pluggability. The male electrical connector 235 includes one or more ground or negative power pins 460, one or more positive power pins 461 and one or more signal pins 462 on top and/or bottom surfaces of the receiver printed circuit board 250. The pins 460, 461, and 462 are staggered from each other with reference to an edge 465 of the receiver printed circuit board 250 to facilitate the hot pluggability. The ground pins 460 of the male electrical connector 235 are closer to the edge 465 than any other pin in the male electrical connector 235 in order for ground to be established first when the fiber optic module is inserted and for ground to be removed last when its removed. The positive power pins 461 are next closest to the edge 465 for power to be established secondly when the fiber optic module is inserted and for power to be removed next to last when its removed. The signal pins 462 are farther from the edge that the power pins 461 and ground pins 462 so that they are established after power and ground has been when inserted and they are disconnect first when the fiber optic module is removed.

During the mating of the male electrical connector 235 with an external female electrical connector, the ground pins electrically couple first to ground receptacles of the external female electrical connector in order to ground the fiber optic module 100. During the demating of the male electrical connector 235 and external female electrical connector, the ground pin electrically decouples from the ground last to maintain the grounding of the fiber optic module 100 until after power is removed from the fiber optic module 100. The ground pins 460 being closer to the edge 465 than the power pins 461 and the signal pins 462, prevents damage and disruption to the fiber optic module and the system during the physical insertion and removal of the fiber optic module into and out of the system. The capability to physically remove and insert the fiber optic module during operation without damage or disruption is referred to as hot pluggability.

The outer housing 400, including the top cover 401 and the bottom cover 402 and the bottom frame 301, may be formed of a conductive material such as a metal or include a conductive plating or surface. With the outer housing 400 formed out of a conductive material, the outer housing 400 can shunt electromagnetic fields radiating into the outer housing 400 to ground via an electrical coupling to chassis ground. In this manner the outer housing 400 also can provide electromagnetic interference shielding to the fiber optic module.

Figure 5:
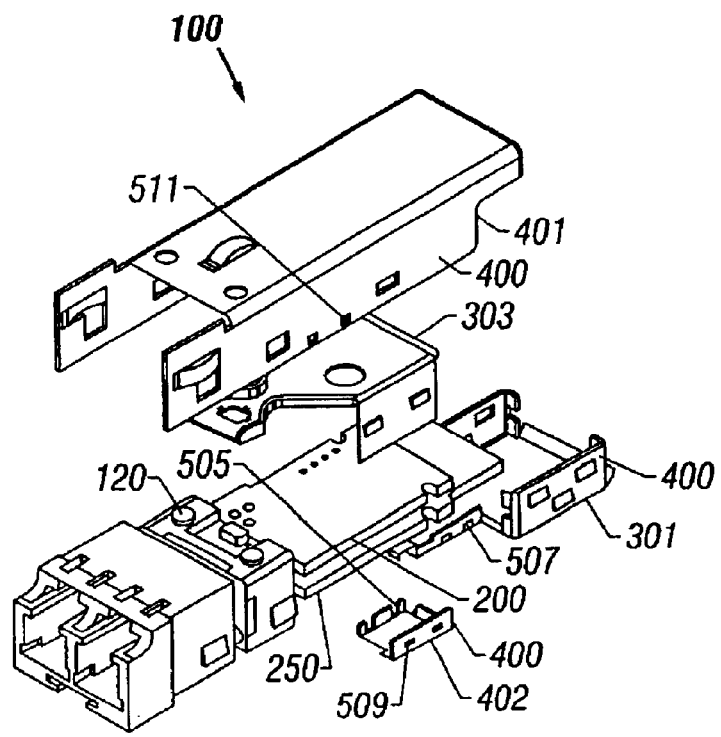
FIG. 5 is exploded view from the front of an embodiment of a fiber optic module.

Referring now to FIG. 5, an exploded view of the fiber optic module 100 from the front is illustrated. The bottom cover 402 of the outer housing 400 includes a pair of tabs 509 on one side and a pair of projections 505 on an opposite side. The projections 505 of the one side engage a pair of holes 507 in a side of the rail 305A of the bottom frame 301. The projections 505 in the opposite side of the bottom cover 402 engage the housing holes 511 in a side of the top cover 401. The inside surface of the side of the top cover 401 couples to the outer surface of the side of the bottom cover 402 when the tabs 509 are mated with the housing holes 511.

The bottom cover 402 can be readily disassembled and reassembled with the top cover 401 and the bottom frame 301 of the fiber optic module 100. By removing the bottom cover 402, a portion of the receiver printed circuit board is exposed to allow access to adjust adjustable electrical components (not shown) on the receiver printed circuit board 250. The adjustable electrical components electrically couple to the electrical components 227 on the receiver printed circuit board 250. The adjustable electrical components electrically couple to the electrical components 229 by way of a conductive path through one or more transmitter traces 361 on the receiver printed circuit board 250, the interconnect vias 225, and the transmitter traces 247 on the transmitter printed circuit board 200. The adjustable electrical components may include DIP switches, potentiometers, variable capacitors and other devices used to tune or adjust the performance of the fiber optic module 100.

The bottom cover 402 can also be formed of a conductive material such as a metal or include a conductive plating or surface which is coupled to chassis ground (via holes 507, housing holes 511 and tabs 505 and projections 509) in order to provide electromagnetic interference shielding for the fiber optic module 100.

Figure 6A:
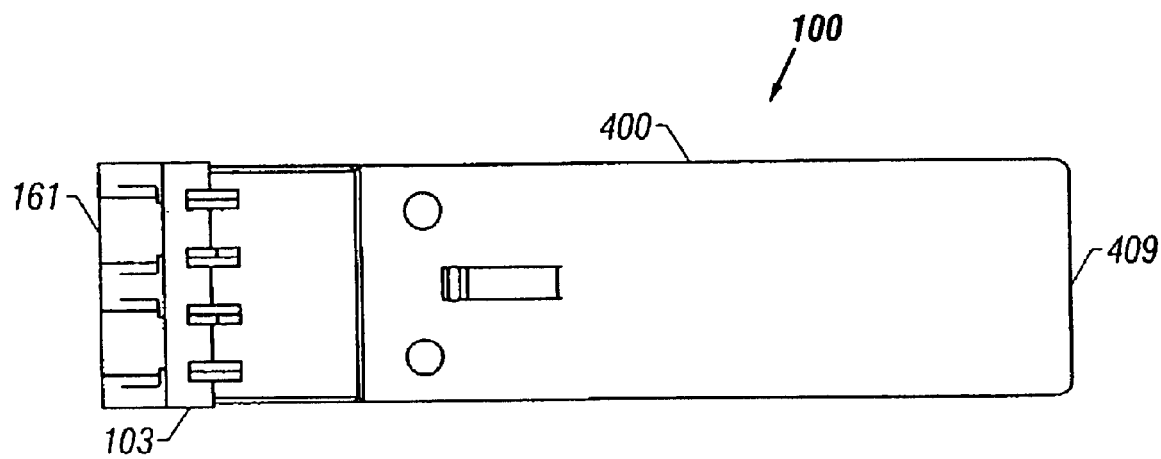
FIG. 6A is a top view of an embodiment of an assembled fiber optic module.
Figure 6B:
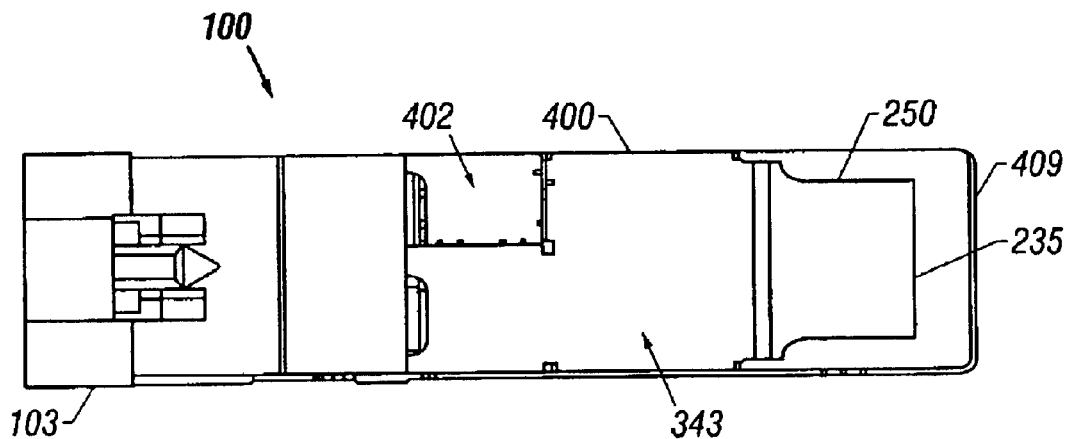
FIG. 6B is a bottom view of an embodiment of an assembled fiber optic module.
Figure 6C:
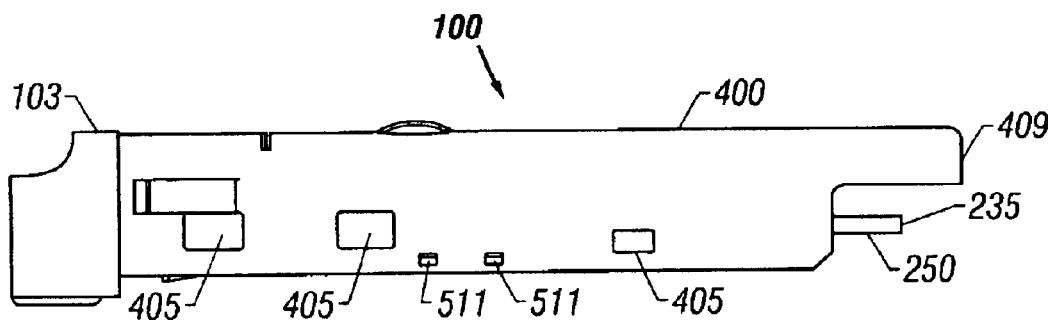
FIG. 6C is a right side view of an embodiment of an assembled fiber optic module.
Figure 6D:
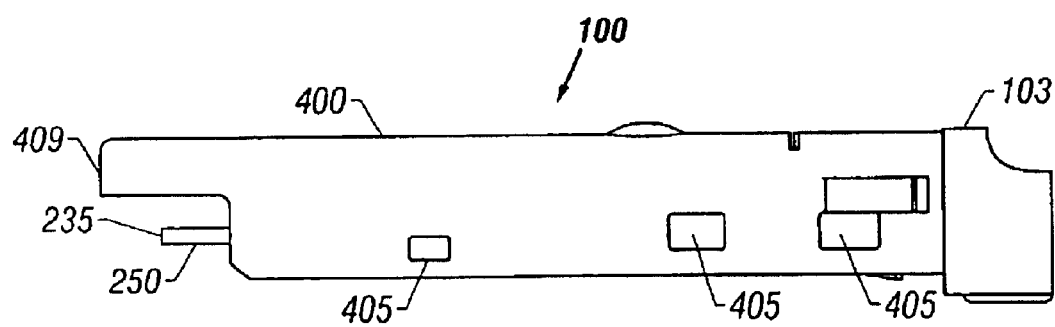
FIG. 6D is a left side view of an embodiment of an assembled fiber optic module.
Figure 6E:
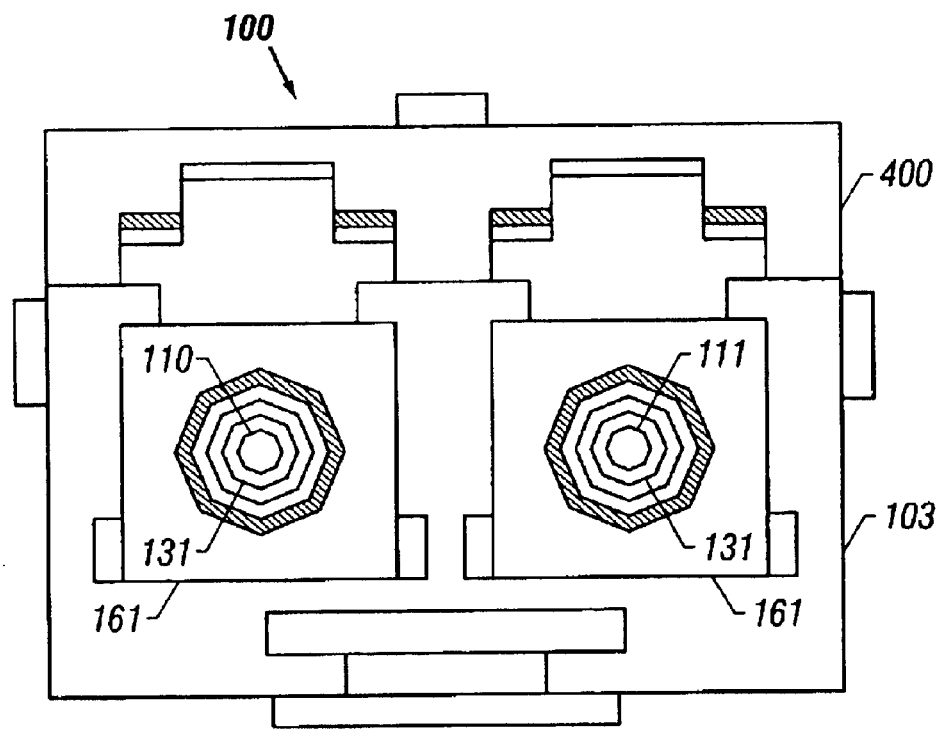
FIG. 6E is a front view of an embodiment of an assembled fiber optic module.
Figure 6F:
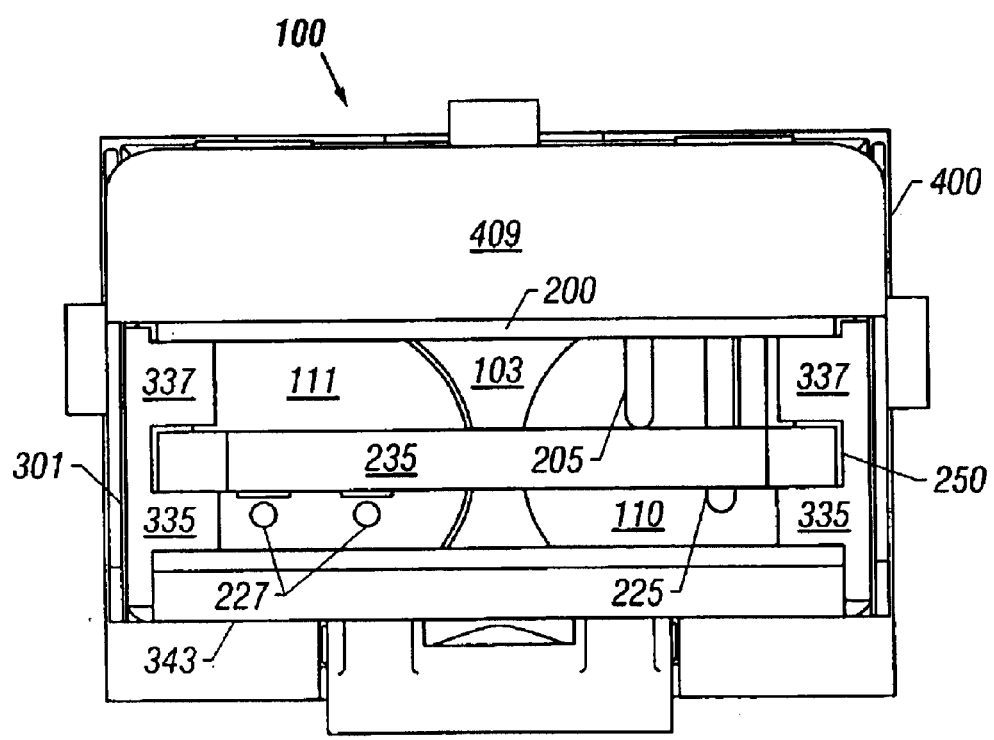
FIG. 6F is a rear view of an embodiment of an assembled fiber optic module.

FIG. 6A illustrates a top view of a fully assembled fiber optic module 100. FIG. 6B illustrates a bottom view of a fully assembled fiber optic module 100. FIG. 6C illustrates a right side view of a fully assembled fiber optic module 100. FIG. 6D illustrates a left side view of a fully assembled fiber optic module 100. FIG. 6C illustrates a front view of a fully assembled fiber optic module. FIG. 6D illustrates a rear view of a fully assembled fiber optic module 100.

To assemble the fiber optic module 100 of the invention, the receiver printed circuit board 250 is first slid into the slots 309 of the bottom frame 301 between the upper support tabs 337 and the lower support tabs 335 until the receiver slots 231 are adjacent to, and just inside an end of the bottom frame 301. When receiver printed circuit board 250 is properly positioned in the bottom frame 301, receiver electrical components 227 are face down, the ground plane is face up and the male electrical connector 235 extends beyond the end of the bottom frame 301 so that its external thereto.

Next, the one or more interconnect leads 225 are then press fit into the receiver interconnect vias 241. Solder is applied to the interconnect leads 225 at the receiver interconnect vias 241.

Then the transmitter interconnect vias 239 of the transmitter printed circuit board 200 are aligned with the one or more interconnect leads and press fit together so that the transmitter printed circuit board rests on top of the upper support tabs 337. With proper orientation, the ground plane is facing down toward the receiver printed circuit board while the transmitter electrical components 229 are on the face up side on the surface of the transmitter printed circuit board 200 and opposite the receiver printed circuit board 250. After press fitting them together, solder is applied to the interconnect leads 225 at the transmitter interconnect vias 239.

The top frame 303 is next in the assembly process. The alignment rails 307 of the top frame 303 are aligned with the transmitter slots 233 and the receiver slots 231. The alignment rails 107 are inserted into the transmitter slots 233 so that external surfaces of the sides 349A and 349B slide into the internal surfaces of the sides 341A and 341B respectively. The top frame 303 is coupled to the bottom frame such that the alignment rails 107 slide through the transmitter slots 233 and the receiver slots 231 until the locking tabs 313 engage with the lock tab apertures 315 to lock the top frame 303 in place relative to the bottom frame 301.

The optical elements 103 are prepared in parallel with forming the printed circuit board assembly 411. A die (not shown) is used to bend the signal leads of the light transmitter 110 through 90 degrees to form the formed signal leads 205 of the invention. The optical elements are then assembled and aligned together as a subassembly 103.

The printed circuit board subassembly 411 is then coupled together to the optical elements subassembly 103. The printed circuit board subassembly 411 is positioned with the optical elements so that the receiver contacts 203 of the receiver printed circuit board 250 align with the space between the horizontal rows of straddle mount signal leads 201. The flange 321 of the top frame 303 is flexed upward so that the opening 317 can mate with the post 319. The printed circuit board subassembly 411 and optical element 103 are brought together so that the receiver contacts 203 can electrically be couple to the straddle mount signal leads 201 and the tip 355A slides into the opening 155. The flange 321 is then released so that the opening 317 slides over the top post 319 to secure the printed circuit board subassembly 411 to the optical element subassembly 103.

Next the outer housing 400 is completed around the printed circuit board subassembly 411. The top cover 311 is aligned with the printed circuit board subassembly 411 so that the locating tab openings 405 can mate with the locating tabs 407. The top cover 401 is slid over the optical element subassembly 103 and the printed circuit board subassembly 411 so that the locating tabs 407 snap into the locating tab openings 405.

The bottom cover 402 is then couple to the bottom frame 301 and the top cover 401. The bottom cover is tilted so that the projections 505 engage the holes 507 in the side of the rail of the bottom frame 301. Then, the top cover 402 is pressed upward so that the tabs 509 engage with the housing holes 511 so that the bottom cover 402 is secured in place to complete the assembly of the fiber optic module 100.

For transmitting signals, the fiber optic module 100 electrically functions such that external electrical transmitter signals arriving at transmitter pins 243 in the male electrical connector 235 are coupled into the transmitter traces 247 routed on the receiver printed circuit board 250. The transmitter traces 247 couple the external electrical transmitter signal from the transmitter pins 243 to the receiver interconnect vias 241. The receiver interconnect vias 241 couple the transmitter signals to the one or more interconnect leads 225. The one or more interconnect leads 225 couple the electrical signals from the receiver interconnect vias 241 at one end into the transmitter interconnect vias 239 at an opposite end. The transmitter traces 247 on the transmitter printed circuit board 200 couple the electrical signals from the transmitter interconnect vias 239 into the transmitter electrical components 229 and/or the transmitter 110. The transmitter electrical components 229 process the electrical signals into electrical transmission pulses for coupling to the light transmitter 110. The light transmitter 110 transduces is the electrical transmission pulses into light pulses for transmission over the fiber optic cables.

For receiving signals, the fiber optic module 100 electrically functions such that external light pulses arriving at the LC receptacles 161 are transduced into electrical pulses by the light receiver 111 for coupling into the receiver electrical components 227. The receiver electrical components 227 process the electrical pulses into electrical receiver signals which are coupled to the receiver traces 249 of the receiver printed circuit board 250. The receiver traces 249 couple the receiver signals to the receiver pins 245 in the male electrical connector 235 by which the electrical receiver signals are coupled to external devices. In one embodiment of the invention, one electrical component on one of the printed circuit boards controls both the light transmitter 110 and the light receiver 111.

In operation, the fiber optic module 100 may be housed in a rack or a cabinet designed to house an LC, GBIC package. When the fiber optic module 100 is inserted into the rack the male electrical connector 235 couples to a 5 female electrical connector of the rack or cabinet. As the electrical connectors couple, one or more ground pins in the male electrical connector 235 electrically couples to one or more corresponding ground receptacles in the female electrical connector before any other pin electrically couples. One or more power pins in the male electrical connector 235 electrically couple to one or more corresponding power receptacles in the female electrical connector before any signal pins electrically couple. After the ground and power pins have coupled, one or more signal pins may then electrically couple to one or more corresponding signal receptacles. Either before or after the fiber optic module is inserted into the rack, fiber optical cables (not shown) are connected to the LC receptacles 161.

When it is desired to replace the fiber optic module 100 for some reason, the invention allows hot pluggable replacement. First the fiber connector is removed from the fiber optic module 100. Then the module is disconnected from any electrical connector into which it is coupled. As it is disconnected, the signal pins decouple first, the power pins second and the ground pins last. After which a new fiber optic module 100 can be inserted with the connecting sequence occurring as discussed above.

After the fiber optic module is disconnected, the optical element subassembly 103 or the printed circuit board subassembly 411 may be easily replaced. To replace the optical element 103, the flange 321 is flexed up to demate the opening 317 and the top post 319. The optical subassembly 103 is then pulled away from the printed circuit board assembly 411. As the optical subassembly is pulled away from the printed circuit board assembly 411, the straddle mount signal leads 201 decouple from the receiver contacts 203. The formed signal leads 205 also decouple from the header signal vias 207. A replacement optical subassembly is then coupled to the printed circuit board assembly 411 as discussed above. After which the fiber optic module 100 (the replacement optical element 103 coupled to the printed circuit board assembly 411) can be inserted with the connecting sequence occurring as discussed is above.

To replace the printed circuit board assembly 411, the fiber optic module is removed as discussed above, except that the fiber optic cables need not be removed from the LC receptacles 161. The flange 321 is flexed up to demate the opening 317 and the top post 319. The optical element 103 is then pulled away from the printed circuit board assembly. As the printed circuit board assembly 411 is pulled away from the optical element 103, the straddle mount signal leads 201 decouple from the receiver contacts 203. The formed signal leads 205 also decouple from the header signal vias 207. A replacement printed circuit board assembly 411 is then coupled to the optical element 103 as discussed above. After which the fiber optic module 100 (the optical element 103 coupled to the replacement printed circuit board assembly 411) can be inserted with the connecting sequence occurring as discussed above.

The previous detailed description describes the fiber optic module 100 as including one receiver and one transmitter. However, one of ordinary skill can see that the fiber optic module 100 may include two or more combinations of vertically stacked receivers, or transmitters, or receivers and transmitters. One embodiment of the invention includes four vertically stacked transmitters. Another embodiment includes four vertically stacked receivers. Yet another embodiment includes a combination of four vertically stacked transmitters and receivers.

Furthermore, as one of ordinary skill can see, the positions of the receiver printed circuit board 250 and the transmitter printed circuit board 200 may be reversed. In this embodiment of the invention, the transmitter printed circuit board 200 has the cutout 209 creating a distance 211 for the formed signal leads 205 of the light receiver 111. The formed signal leads 205 of the light receiver 111 couple to the header signal vias 207 on receiver printed circuit board 250. The straddle mount signal leads 201 of the light transmitter 110 couple to contacts on the transmitter printed circuit board 200. In this embodiment, the electrical components 227 and 229 are on opposite surfaces of the printed circuit boards 250 and 200 so that the ground planes 213 and 215 provide electromagnetic shielding to the electrical components 227 and 229.

In another embodiment of the invention, the transmitter printed circuit board 200 includes the male electrical connector 235. Receiver traces 249 of the transmitter printed circuit board 200 couple receiver pins 245 of the male electrical connector 235 to the interconnect vias 225. The interconnect vias 225 couple the receiver traces 249 of the transmitter printed circuit board 200 to receiver traces 249 of receiver printed circuit board 250 for coupling to receiver electrical components 227. The transmitter printed circuit board 200 also includes a portion that protrudes from the outer housing 400 and that includes the male electrical connector 235, thereby allowing the male electrical connector 235 to couple to an external female electrical connector.

Referring back to FIGS. 6B–6D and 6F, the fiber optic module includes a fixed hook or boss (also referred to as a triangle) 602 to mate with a catch of a latch of a cage. The fixed hook or boss 602 is a part of the nose receptacle 151 of the fiber optic module.

One aspect of the invention provides a rentention and release mechanism for removable or pluggable fiber optic modules which are coupled into a module receptacle or cage assembly. Additionally, a piggy-back or belly-to-belly fiber optic module configuration is provided. The retention and release mechanism is a mechanical device for de-latching or unplugging a fiber optic module from a module receptacle or cage assembly and holding it affixed thereto. The invention is particularly applicable to an SFP fiber optic module and an SFP cage assembly or module receptacle.

To de-couple a pluggable fiber optic module from a cage or module receptacle, the pluggable fiber optic module is de-latched or unlatched and unplugged from any sockets or connectors of the cage or module receptacle.

Figure 7D:
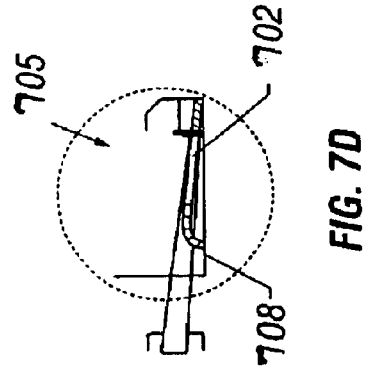
FIGS. 7A–7E are views of an exemplary cage assembly or module receptacle for fiber optic modules.
Figure 7E:
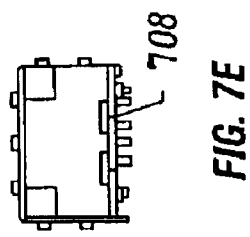
Figure 7A:
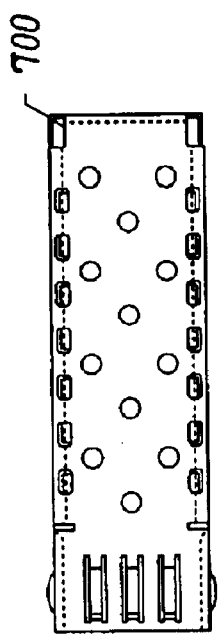
Figure 7B:
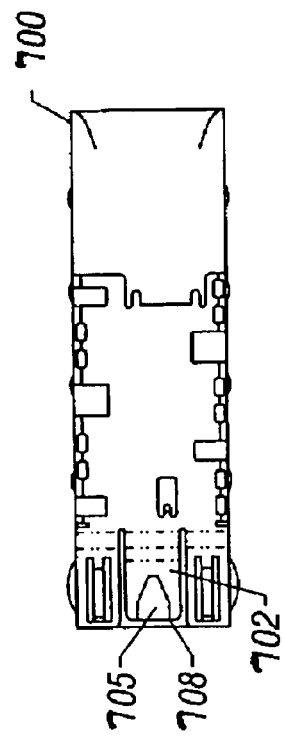
Figure 7C:
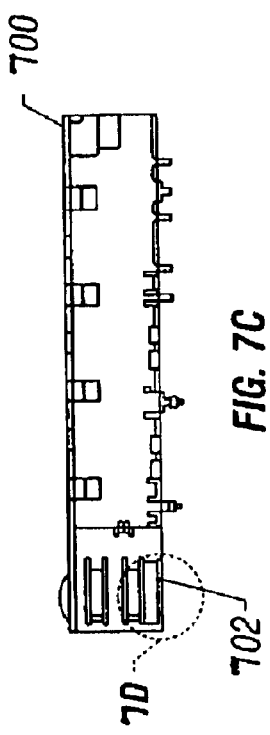

Referring now to FIGS. 7A–7E, views of an exemplary cage assembly or module receptacle 700 for fiber optic modules is illustrated. In FIG. 7B, the latch 702 is illustrated in a bottom view of the module receptacle 700. The latch 702 includes a catch 705 that mates with a hook or boss (also referred to as a triangle) of a fiber optic module. As illustrated in the cross sectional view of FIG. 7C and the exploded cross-sectional view of FIG. 7D, the latch 702 may be flexed downward in order to release the fiber optic module. The latch 702 may be flexed downward when a force is exerted thereon. In embodiments of the invention, the hook or boss (also referred to as a triangle) of the fiber optic module is moved upward out from the latch 702 so that the hook or boss is released from the catch 705.

An embodiment of the invention may be referred to as a moving triangle-bail lever assembly. The moving triangle-bail lever assembly may include a moving triangle ("MT") nose receptacle, an MT lever, one or more bail pins, an MT bracket, an MT pin, and an MT pivot arm actuator including a triangle.

Figure 8A:
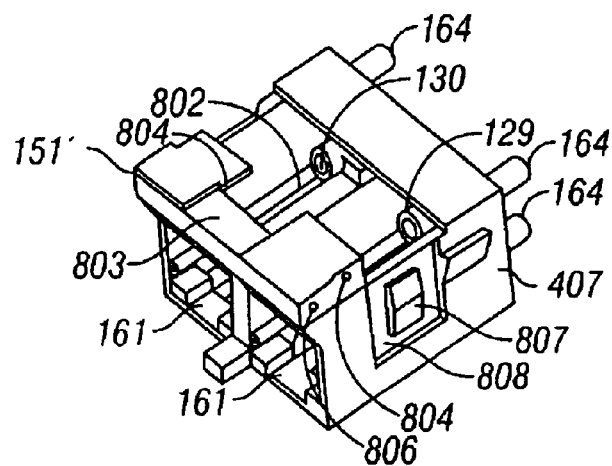
FIGS. 8A–8B are views of an exemplary fiber optic receptacle for fiber optic modules.
Figure 8B:
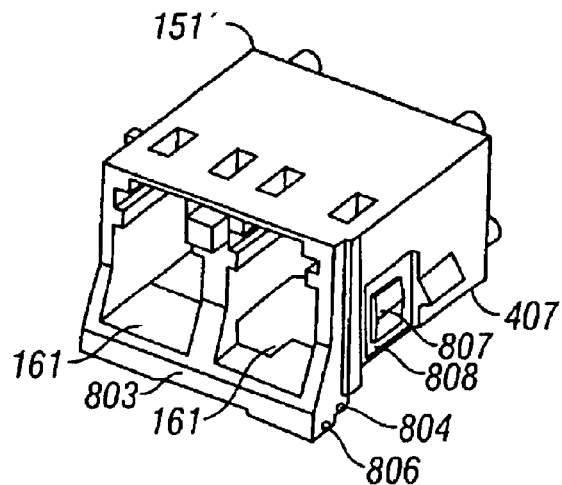

Referring now to FIGS. 8A–8B, a bottom and top perspective view of a nose receptacle 151' are illustrated respectively. Nose receptacle 151, is somewhat similar to the nose receptacle 151 previously described. Nose receptacle 151' may also be referred to as a moving triangle ("MT") receptacle. However, nose receptacle 151' does not have a boss or hook 602 and has other different features. In fact the portion of the nose receptacle 151' where a boss or hook might otherwise be formed as a part thereof is open region 802. The nose receptacle 151' further includes a slot 803 in its base in order to accommodate a pivot arm actuator which will be described further below. The nose receptacle 151' further includes a first pin opening 804, a second pin opening 806, and a pair of rectangular shaped slots 808 around a pair of locating tabs 807 on each respective side. The first pin opening 804 and the second pin opening are for accommodating respective pins. The pair of rectangular shaped slots 808 are for accommodating sides of a bracket which will be described further below. The nose receptacle 151' is molded out of a thermoplastic in a preferred embodiment.

Figure 9:
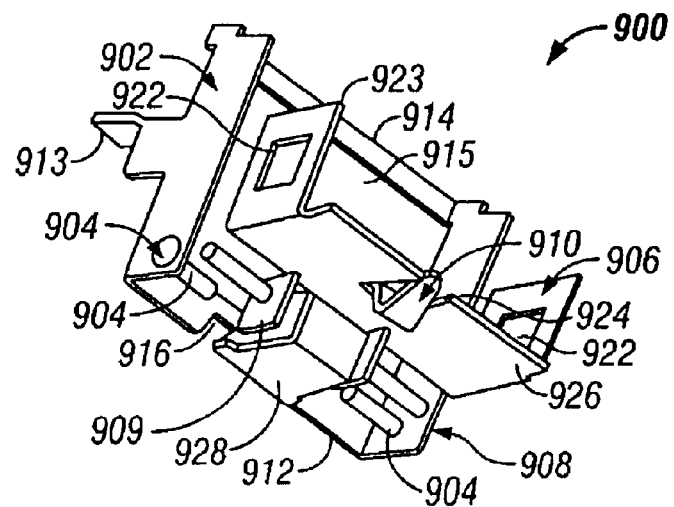
FIG. 9 illustrates an embodiment of the retention and release mechanism of the invention apart from the fiber optic module.

Referring now to FIG. 9, an embodiment of the retention and release mechanism of the invention apart from the fiber optic module is illustrated. FIG. 9 illustrates an MT Lever 902, a Bail Pin 904, an MT Bracket 906, an MT Pin 908, and a pivot arm-actuator 909 including an MT Triangle 910 assembled together. The assembly illustrated in FIG. 9 may also be referred to as a moving triangle-bail lever assembly or a MT bail-lever delatching mechanism. The moving triangle 901 may also be referred to as a releasable triangle or a moving or releasable hook or a moving or releasable boss.

The lever 902 includes a bottom bar 912 and may include a push tab 913 or a pull arm 914 for a user to move the lever. Other embodiments of the lever 902 are further described below with reference to FIGS. 16A–16I. The lever 902 further includes a slot 916 to actuate the pivot arm-actuator 909. The lever 902 may further include an opening 915 which allows a finger to be inserted to pull out the fiber optic module when in an disengaged position. The opening 915 also allows fiber optic plugs and optical fibers to be inserted into the nose receptacle 151' when the lever 902 is in an engaged, upright, or closed position. The pulling arm 914 or push tab 912 may include a grip to ease grabbing the bail lever 902 from an engaged position into a disengaged or open position.

"The MT bracket 906 may include rectangular locating tab openings 922 at each side to fit over locating tabs 807 and couple into the slots 808 of the nose receptacle 151'. The MT bracket 906 may further include a slot or opening 924 through which the triangle 910 may move through as the pivot arm-actuator 909 pivots. The MT bracket 906 may further include a base 926 which can act as a stop for the pivot arm actuator 909 in one direction. The bracket 906 may further include a flexible arm portion 928 to act as a spring mechanism. The flexible arm portion 928 supports one end of the pivot-arm actuator 909 so that the moving triangle 910 can extend out through the slot 924 in one state. With a force applied against the pivot arm actuator 909 and the flexible arm portion 928 on one end, the moving triangle 910 can be retracted through the slot 924 and flush with the base 926."

The bail pin 904 may extend through each side of the nose receptacle 151' in the opening 906 or otherwise be a pair of pins extending from each side of the lever 902 into the opening 906 in each side. The pin 908 extends through the pivot arm actuator 909 into the openings 804 in each side of the nose receptacle 151'.

The lever 902, the pivot arm-actuator 909, and the bracket 906 may be formed by being either stamped or etched out of a metal material and then formed to have their respective features in a preferred embodiment. Otherwise, all or some of the parts or components, or a combination thereof, can be formed out of other substantially solid materials such as plastic (including a thermoplastic), thermosett, or epoxy. The pins 904 and 908 may be formed by being either extruded or machined out of a metal material in a preferred embodiment. Otherwise, the pins can be formed out of plastic (including a thermoplastic), thermosett, epoxy, or other solid materials.

Figure 10A:
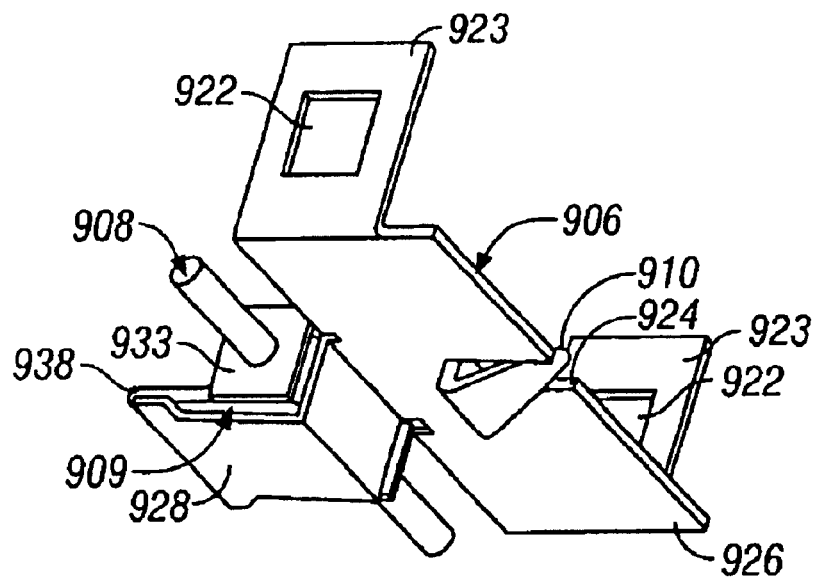
FIGS. 10A–10B illustrates views of the moving triangle piece and the bracket apart from the fiber optic module.
Figure 10B:
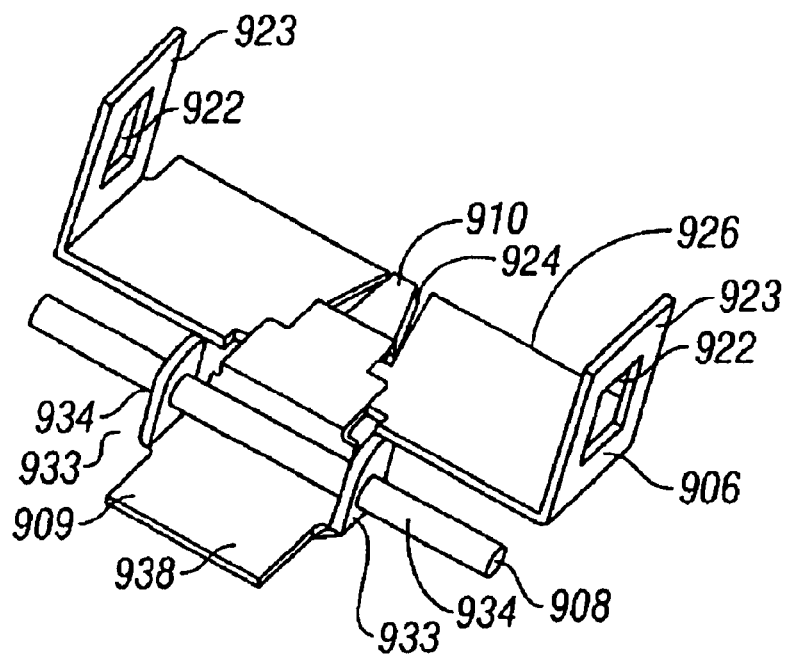

FIGS. 10A–10B illustrates views of the pivot arm-actuator 909 including the moving triangle 910 and the bracket 906 apart from the receptacle 151' of a fiber optic module. The locating tab openings 922 form rectangular sides panels 923 in the bracket 906. The rectangular side panels 923 couple into the rectangular slots 808 of the nose receptacle 1511 while the locating tab openings 922 allow the locating tabs 807 to extend through. The bracket 906 further includes the flexible arm portion 928 to support the end of the pivot arm actuator 909 opposite the moving triangle 910.

The moving triangle 910 of the pivot arm actuator 909 is allowed to move through the slot 924 in the base 926 of the bracket 906. The moving triangle 910 retracts into the opening 802 in the nose receptacle 151' in order to disengage from the catch in the latch of the cage assembly 700. The moving triangle 910 may retract sufficiently so that its flush with the base 926 or recessed with the base 926 of the bracket 906. The moving triangle 910 may move along an arc as the pivot arm actuator 909 pivots about the pin 908.

Referring to FIG. 10B, the pivot arm actuator 909 further includes the moving triangle at one end and a platform 938 at an opposite end. The pivot arm actuator 909 further includes a pair of side tabs 933 each including a pin opening 934 near a middle portion. The pin 908 is coupled into each of the pin openings 934 near the middle portion of the pivot arm actuator 909. A surface of the platform 938 may rest on the flexible arm portion 928 of the bracket 906. The shape of the slot 924 of the bracket 906 may conform to the shape of the moving triangle 910 allowing for gaps there-between. A middle portion 925 of the pivot arm actuator 909 may rest on the base 926 of the bracket 906 to avoid over extension of the moving triangle 910 out from the slot 924.

Figure 11:
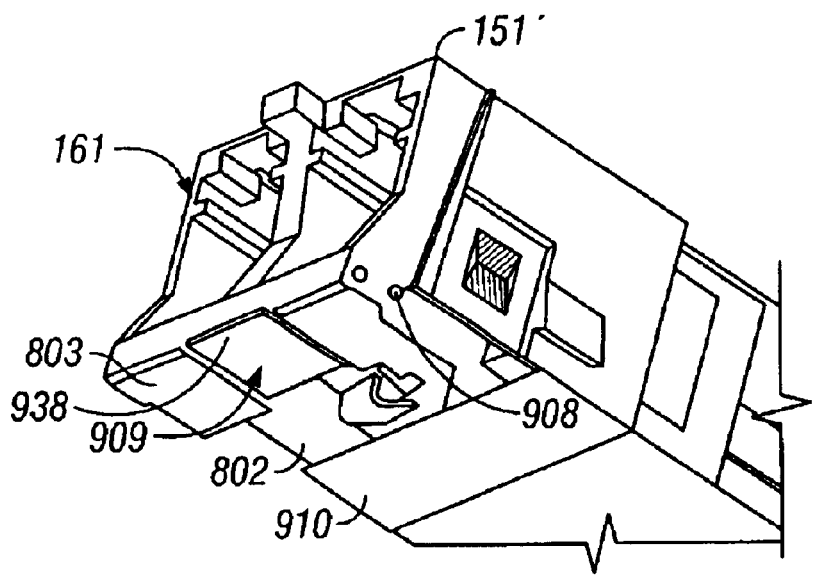
FIG. 11 illustrates the assembly of the moving triangle piece to the optical receptacle of FIGS. 8A–8B.
Figure 12:
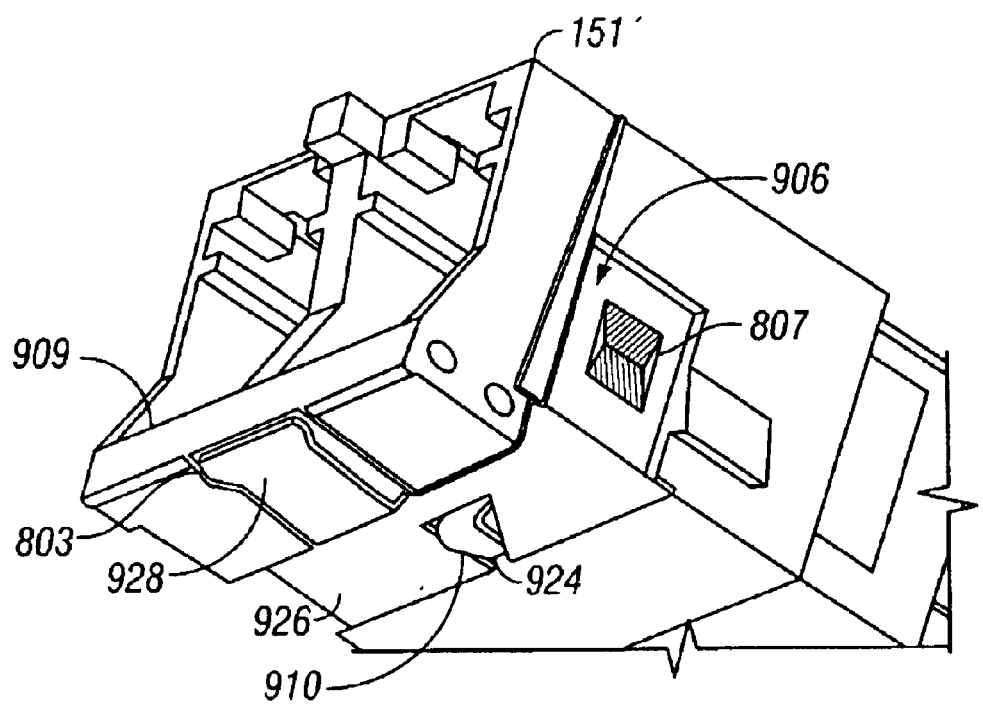
FIG. 12 illustrates the assembly of the bracket to the optical receptacle of FIGS. 8A–8B.
Figure 13:
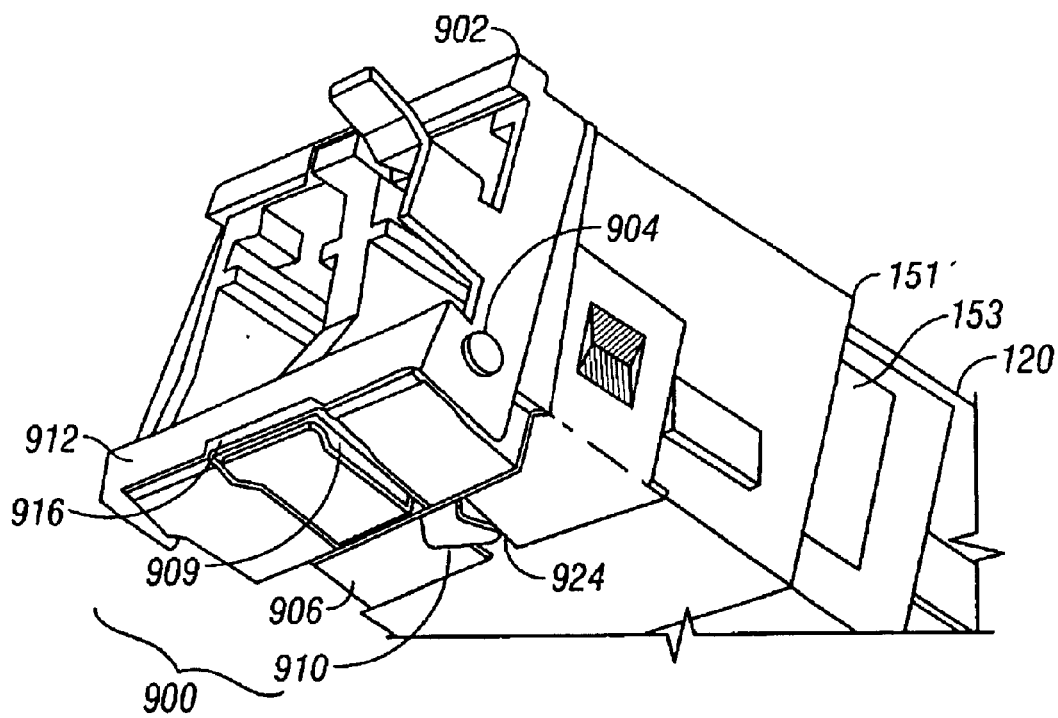
FIG. 13 illustrates the assembly of the lever to the nose receptacle of FIGS. 8A–8B and its assembly to a fiber optic module.

FIGS. 11–13 illustrate the assembly of the moving triangle-bail lever assembly of FIG. 9 to the nose receptacle 151' of FIGS. 8A–8B.

Referring now to FIG. 11, the assembly of the pivot arm actuator 909 to the nose receptacle 151' of FIGS. 8A–8B is illustrated. The pivot arm actuator 909 is inserted into the base of the nose receptacle 151' so that its pin openings 934 align with the pin openings 804. In this manner, the platform 938 should align with the slot 803 in the nose receptacle 151'. The pin 908 is inserted into pin openings 804 so that it extends through the pin openings 934 of the pivot arm actuator 909. This pivotably or rotatably couples the pivot arm actuator 909 to the nose receptacle 151'. The platform 938 extends out slightly from the base of the nose receptacle 151' so that it can engage the bar 912 of the lever 902.

Referring now to FIG. 12, the assembly of the bracket 906 to the nose receptacle 151' of FIGS. 8A–8B is illustrated. The bracket 906 is fitted to the base of the nose receptacle 151' over the pivot arm actuator 909 and couples to the sides of the nose receptacle. The side panels 923 of the bracket 906 are fitted over nose receptacle 151' to engage the slots 808 such that the locking tabs 807 engage the tab openings 922. This couples the bracket 906 to the nose receptacle 151' so that it supports the pivot arm actuator 909. The slot 924 of the bracket 906 aligns with the moving triangle 910. But for the slot 924, the base 926 of the bracket 906 substantially covers the open region 802 in the nose receptacle 151'. The flexible arm 928 of the bracket 906 may align with the slot 803 in the nose receptacle 151' as well.

Referring now to FIG. 13, the assembly of the lever 902 to the nose receptacle 151' of FIGS. 8A–8B is illustrated with the pivot arm actuator 909 and the bracket 906 assembled to the nose receptacle 151', the lever 902 can be fitted thereon. In one embodiment, each end of the pins 904 is fitted over the sides of the nose receptacle 151' so that they pivotally or rotatably couple into the openings 804. In another embodiment, pin openings in the lever 902 are aligned with the pin openings 804 in the nose receptacle 151'. A pin 904 is inserted into the pin openings in the lever 902 and the pin openings 804 in the nose receptacle 151'. Pins 904 rotatably couple into the openings 806 so that the lever 902 can pivot and rotate. The lever 902 includes the push tab 912.

The nose receptacle 151' including the retention and release mechanism 900 of the invention, is assembled together with a fiber optic module. The nose receptacle 151' is coupled to an optical block 1320 and may be coupled to a shield plate 153 there-between. After which, the assembly of the fiber optic module continues as previously described with reference to fiber optic module 100.

Figure 14A:
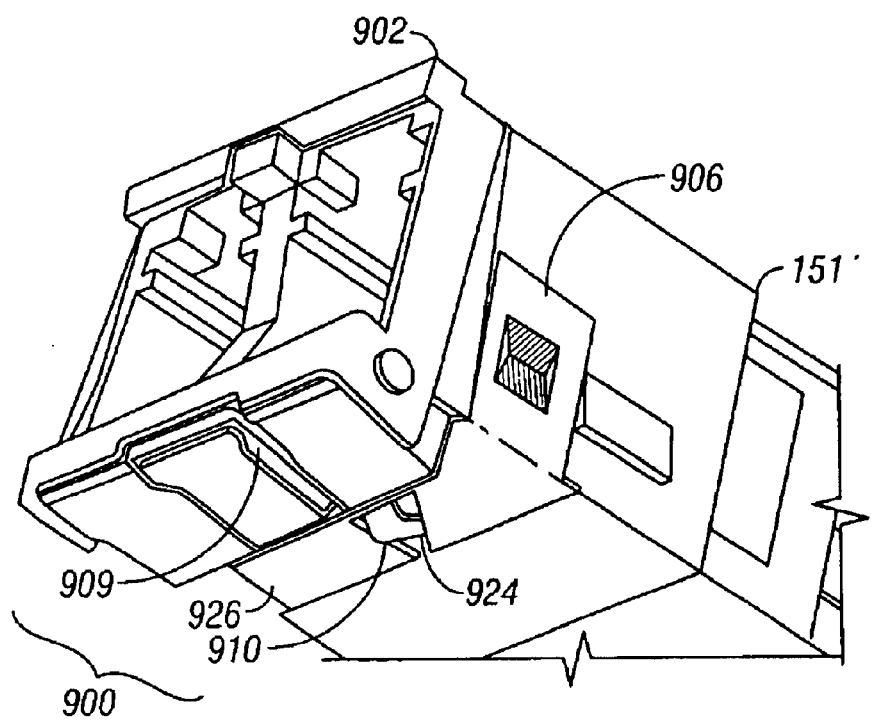
FIGS. 14A–14C illustrate the operation of the retention and release mechanism apart from the cage assembly.
Figure 14B:
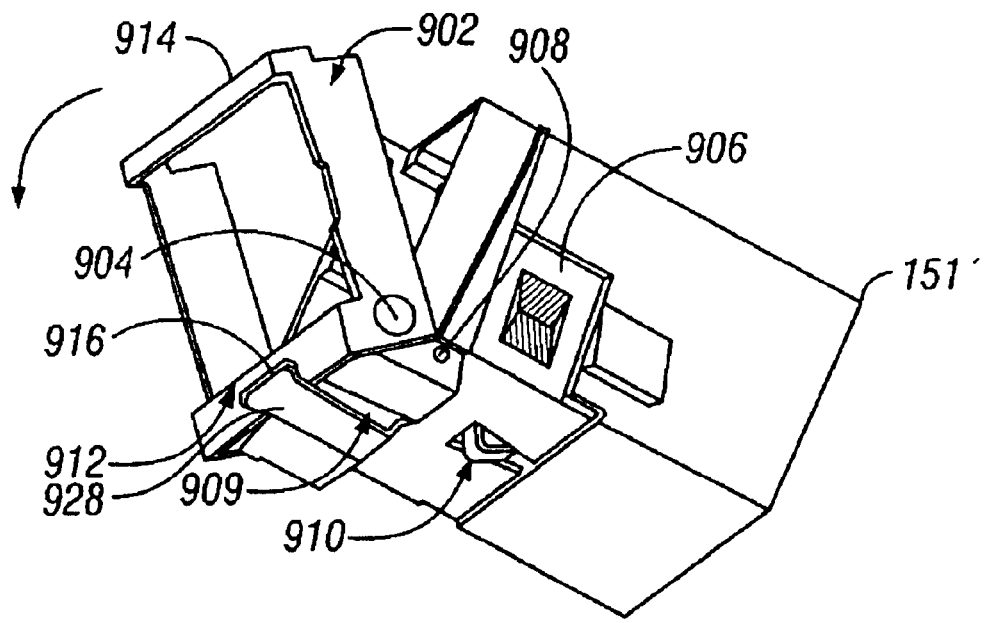
Figure 14C:
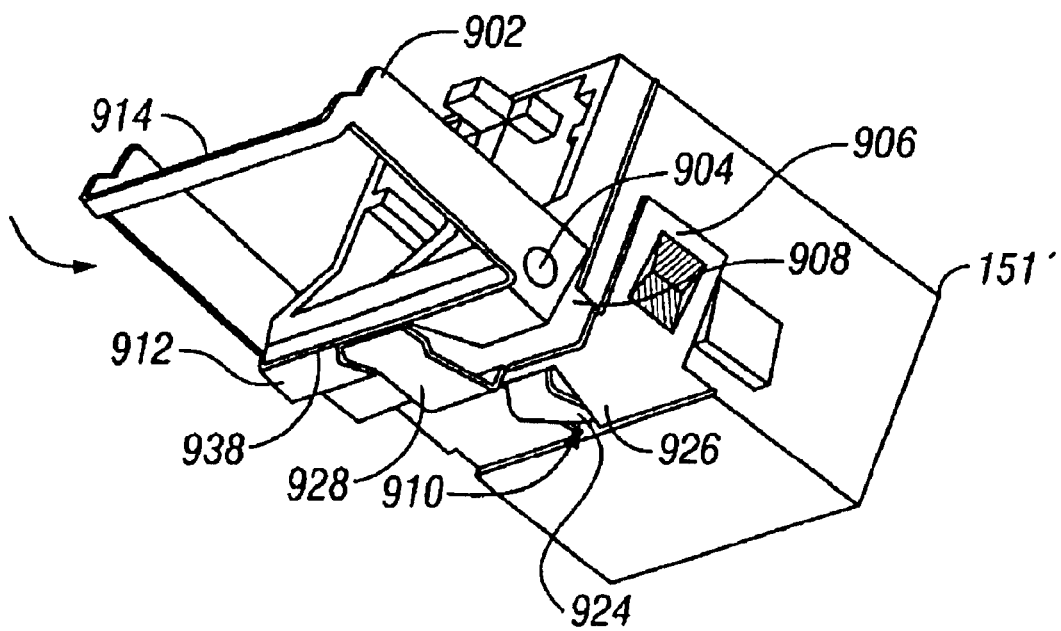

FIGS. 14A–14C illustrate the operation of the retention and release mechanism of a fiber optic module apart from the cage assembly. FIG. 14A illustrates an engaged, original, or steady state of the retention and release mechanism 900. The arm 914 of the lever 902 is stowed next to the nose receptacle 151'. The moving triangle 910 extends out through the slot 924 beyond the outside surface of the base 926 of the bracket 906. In this state, the moving triangle 910 can engage the catch 705 of the latch of the cage assembly 700. The fiber optic module can be retained within the cage assembly 700 and hold its electrical connection to an electrical connector of a host system board.

Referring now to FIG. 14B as the lever 902 is extended outwards it pivots on the pins 904 and the bottom bar 912 makes contact with the platform 938 of the pivot-arm actuator 909. The slot 916 in the bottom bar 912 may align with the platform 938. The pivot-arm actuator 909 can pivot around the MT pin 908. The pivot-arm actuator 909 acts like a "seesaw" or a "teeter", pivoting around the MT pin 908 when the lever 902 is extended and released. On one side of the seesaw is the platform 938 while on the other side is the moving triangle 910. As the platform 938 is pushed on (i.e., pushed down) by the bottom bar 912 of the lever 902, the moving triangle 910 begins retracting (i.e., its pushed up) into the nose receptacle 151' through the slot 924 in the bracket 906.

Referring now to FIG. 14C when the lever 902 is further extended and the platform 938 is further pushed on by the bottom bar 912, the pivot arm actuator is further pivoted such that the moving triangle 910 is fully retracted into the receptacle 151'. With the moving triangle 901 substantially retracted into the nose receptacle 151', the triangle is disengaged from the catch in the latch of the cage in order to release the fiber optic module from the cage into which it was inserted. A user can pull out on the fiber optic module using the arm 914 of the lever 902 with his or her finger and slide it away from the cage. Otherwise without releasing the lever 902, a user may grip the sides of the nose receptacle and pull out. A grip may be provided on the side of the nose receptacle 151' to facilitate this.

When the platform 938 is pushed on by the bottom bar 912 of the lever 902, the flexible arm portion 928 of the bracket 906 is deflected or flexed. The flexing or deflection of the flexible arm portion 928 generates a counteracting force or bias force to push back on the platform 938 to pivot the pivot arm actuator 909 and extend out, into an engaged position, the moving triangle 910 from the nose receptacle 151' when the lever 902 is moved back to its original static state as illustrated in FIG. 14A.

Figure 15A:
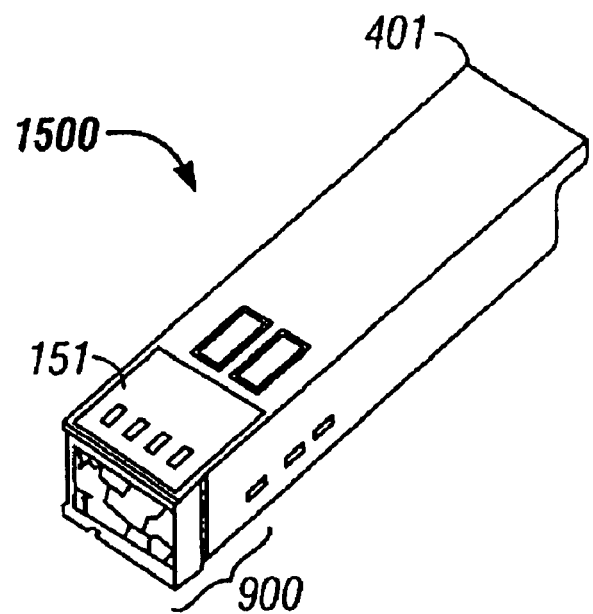
FIGS. 15A–15B illustrate views of a fiber optic module including the retention and release mechanism as another embodiment of the invention.
Figure 15B:
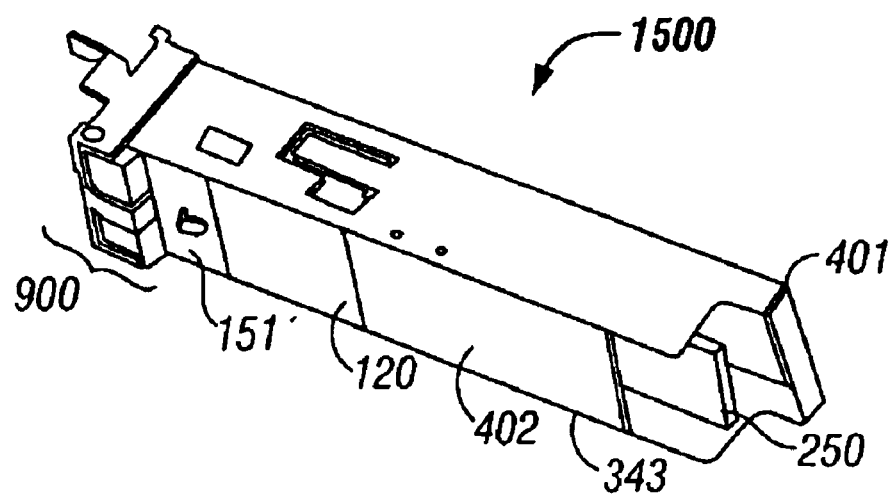

FIGS. 15A–15B illustrate views of a fiber optic module 1500 including the retention and release mechanism 900 and the nose receptacle 151'. But for the retention and release mechanism 900 and the nose receptacle 151', the fiber optic module 1500 is somewhat similar to the structure and functionality of the fiber optic module 100 previously described with reference to FIGS. 1–6. The similar structure will not be repeated here for reasons of brevity. Note that the lever 902 extends out from the housing 401 such that it is accessible when the fiber optic module 1500 is inserted into a cage assembly 700.

FIGS. 16A–16H illustrate various views of alternate embodiments of the lever 902 as well as other delatching mechanisms that can function similar to the lever 902 with a slot 916.

"FIG. 16A illustrates a lever 902A' in which the pivot pin 904 is replaced with two smaller pins 904A' that do not extend across the width of the lever 292A'. Additionally, the lever 902A' does not include the slot 916 in the bar 912, as well may other embodiments. The pull arm 919A' of the lever 902A' is also bent forward to further retract away from the optical receptacles 161."

"FIG. 16B illustrates a lever 902B' with a partial pull arm 914B' coupled to a lever arm 1601 instead of a complete bail lever pull arm. The lever 902B' may include a pair of pivot pins 904A' instead of a single pivot pin."

FIG. 16C illustrates a lever 902C' with a partial pull arm (as in FIG. 16B) with a long pivot pin 904C' coupled to the lever 902C' at only one side.

FIG. 16D illustrates a lever 902D' with an enclosed pull arm 914D' with no angles.

"FIG. 16E illustrates a lever 902E' with a semi-circular pull arm 914E'."

FIG. 16F illustrates a lever 902F' with just a lever arm 914F' to release the fiber optic module from the cage assembly.

FIG. 16G illustrates a lever 902G' with pivoting conical retainers 1606G' instead of pivot pins to couple the lever 902G' to the fiber optic module.

FIG. 16H illustrates a lever 902H' with holes 1602 rather than pins. The sides of the fiber optic module or nose receptacle provides pins or protrusions which fit through the holes 1602 to pivotally couple the lever 902H' to the fiber optic module.

"FIG. 16I illustrates a lever 902I' that includes a spring 1619."

"FIG. 16I illustrates a lever 902I' similar to that shown in FIG. 16F but with a spring 1619 to retract it against the face of the fiber optic module when a user is not pulling or otherwise rotating it. The spring 1619 applies a force to the lever 902I' in order to return it to its engaged, closed or static state. The spring may be mounted along the pivoting axis of the latch or in other well known configurations to retract the latch arm 902I' when not in use. The spring 1619 may be any kind of spring including a coil spring, leaf spring, carriage spring, compression spring, conical spring, helical spring, volute spring, spiral spring, scragged spring, and other well known types of springs."

According to one implementation, one end of the spring is coupled to the lever 902I'. As the arm 912I' is rotated it causes spring 1619 to compress (or decompress). When the lever 902I' is released the spring decompresses (or compresses) to bring the lever against the fiber optic module face.

In another embodiment, one end of the spring is coupled to the fiber optic module or nose receptacle so that when the lever is pulled or rotated from its closed position it causes the spring to compress (or decompress). When the lever is released the spring decompresses (or compresses) to push the lever against the fiber optic module face (its closed position).

It is desirable to increase the density of fiber optic modules in a system. Another way of doing so is to place fiber optic modules in a belly-to-belly mounting configuration on opposite sides of a host printed circuit board.

Figure 17A:
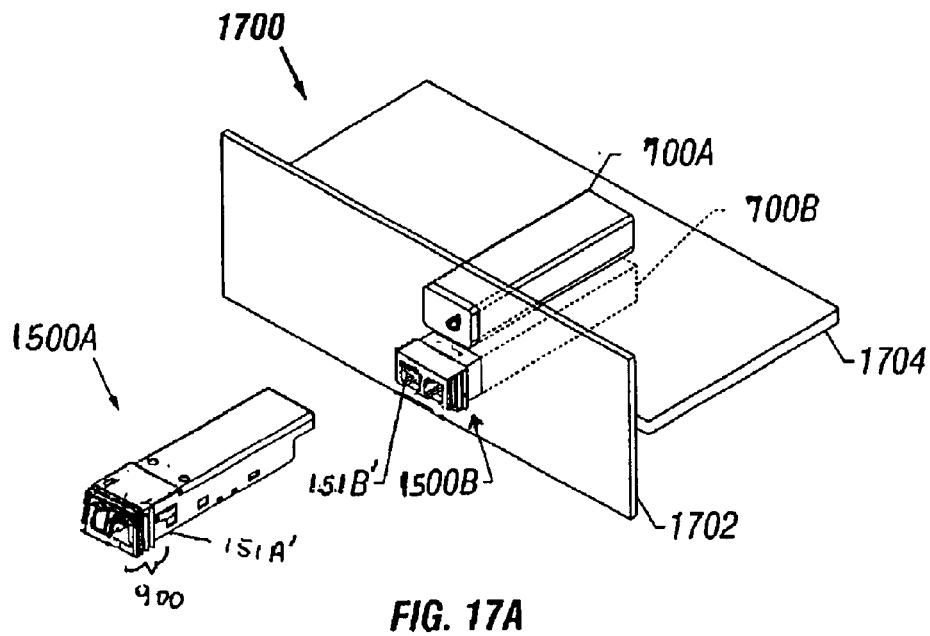
FIG. 17A is a perspective view of a fiber optic system with a belly-to-belly mounting configuration with the top fiber optic module removed.
Figure 17B:
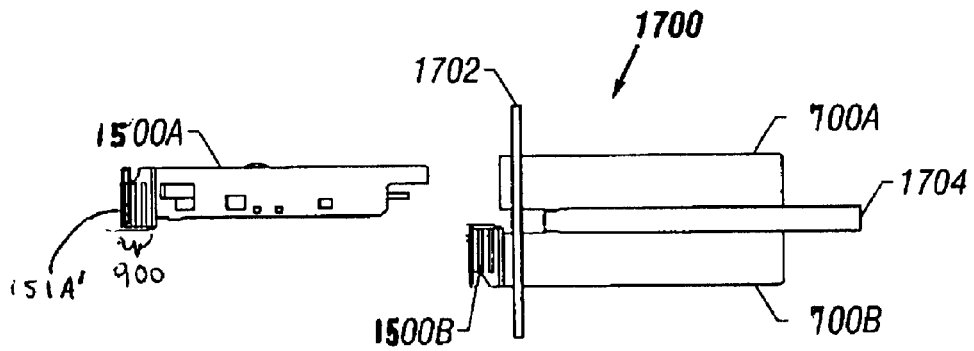
FIG. 17B is a side view of the fiber optic system with a belly-to-belly mounting configuration of FIG. 17A.
Figure 17C:
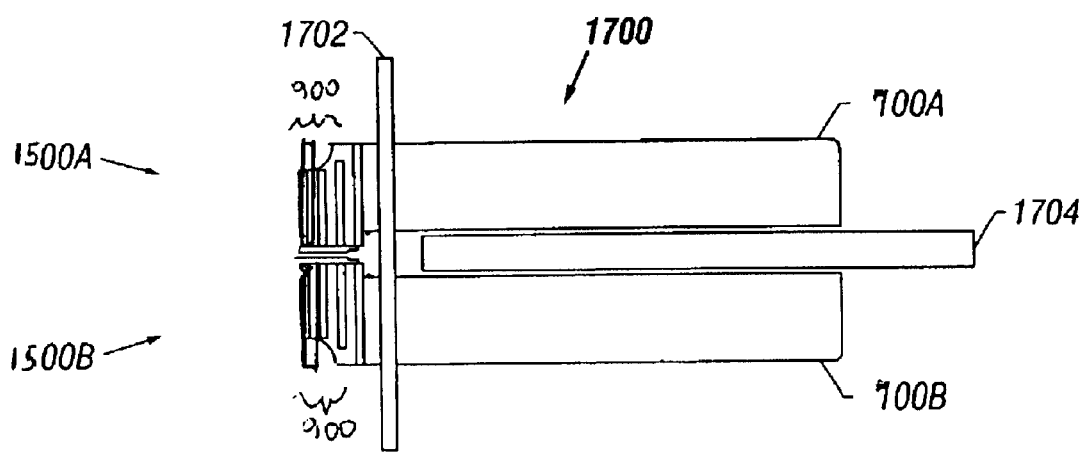
FIG. 17C is a side view of the fiber optic system with a belly-to-belly mounting configuration of FIG. 17A with the top fiber optic module inserted.
Figure 18I:
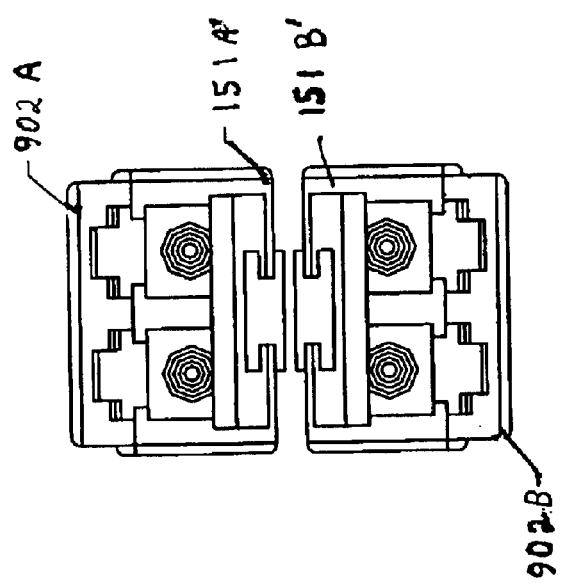
Figure 18H:
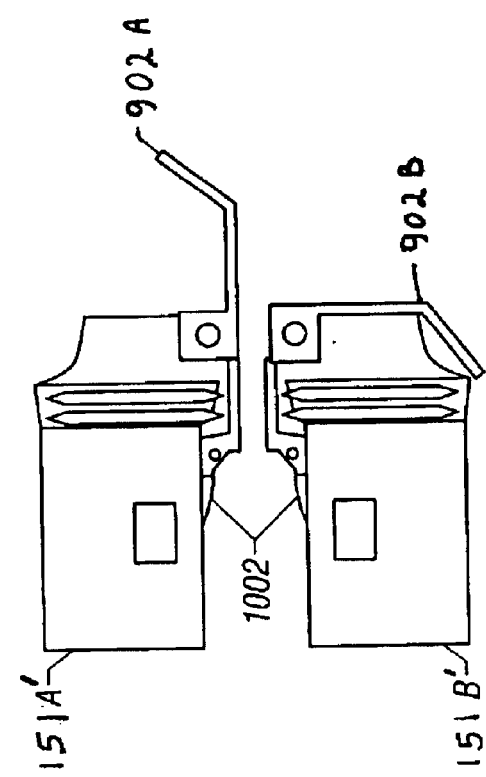
Figure 18G:
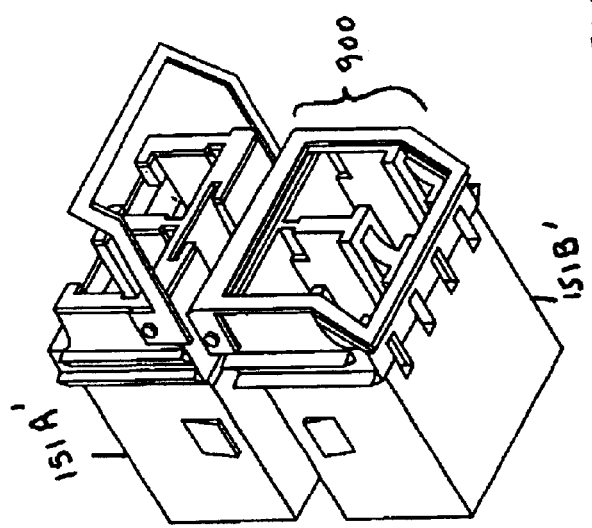

Referring now to FIGS. 17A–17C, such a high density fiber optic system 1700 is illustrated providing a belly-to-belly mounting configuration. System 1700 includes a face plate or bezel 1702, and a host printed circuit board 1704. For a belly to belly configuration of fiber optic modules, the bezel or face plate 1702 includes one or more openings 1706A–1706B therein in order to allow fiber optic cables to interface to the fiber optic modules, and in case of pluggable fiber optic modules such as fiber optic modules 1500A and 1500B, the openings 1706A–1706B in the bezel or face plate 1702 also allow the insertion and removal of the fiber optic modules themselves.

The retention and release mechanism 900 facilitates easy removal of the fiber optic module 1500A and 1500B when in a belly-to-belly configuration. The retention and release mechanism 900 of the fiber optic module 1500A and the retention and release mechanism 900 of the fiber optic module 1500B meet together when both fiber optic modules are inserted into the respective module receptacles or cage assembles 700A and 700B. The cages 700A and 700B sandwich the host printed circuit boards 1704. While only two fiber optic modules are illustrated in FIG. 17A in a belly-to-belly configuration, it is understood that additional fiber optic modules can be arrayed out as belly-to-belly configured fiber optic modules side by side in the system 1700 so that a plurality of fiber optic modules 1500 maybe inserted therein.

Referring now to FIGS. 18A–18I various views of how the MT bail-lever delatching mechanism would function in a belly-to-belly mounting configuration for another embodiment of the invention. A first fiber optic module and a second fiber optic module can be engaged into cages in a belly to belly configuration in which case a first nose receptacle 151A' would be adjacent and parallel to a second nose receptacle 151B' as illustrated in FIGS. 18A–18I. The first nose receptacle 151A' and second nose receptacle 151B' are instances of the nose receptacle 151' of FIGS. 8A–8B.

"While FIGS. 18A–18I illustrate only the first lever 902A being in an open or disengaged position, either the first or second levers 902A or 902B can be opened or in a disengaged position. Alternatively, both the top or bottom levers 902A and 902B can be opened or disengaged for some reason if desired. This belly-to-belly configuration for fiber optic modules is described further with reference to FIGS. 17A–17D above; that description applies to fiber optic modules employing the bail lever delatching mechanism of the nose receptacle 151' described herein."

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. While the invention has been described in particular embodiments, the invention should not be construed as limited by such embodiments.

What is claimed is:

1. A lever-actuator for fiber optic modules, the lever-actuator comprising:
   a lever arm having a first end;
   a pivoting fastener coupled to the first end of the lever arm; and
   a cross-member coupled to the first end of the lever arm and including an actuating slot, the cross-member to couple to a second actuator at the actuating slot, the second actuator to disengage a fiber optic module from a cage assembly in response to a rotation of the lever-arm.

2. The lever-actuator of claim 1 wherein
   the pivoting fastener includes a pin to rotationally couple the lever-actuator to the fiber optic module.

3. The lever-actuator of claim 1 wherein
   the pivoting fastener includes one or more holes to receive one or more pins to rotationally couple the lever-actuator to the fiber optic module.

4. The lever-actuator of claim 1 further comprising:
   a pull-arm coupled to the lever arm.

5. The lever-actuator of claim 4 wherein,
   the pull-arm is a semi-circular ring.

6. The lever-actuator of claim 4 wherein,
   the pull-arm is a tab.

7. The lever-actuator of claim 4 wherein,
   the pull-arm is a bail-latch.

8. The lever-actuator of claim 1 wherein
   at the actuating slot, the cross-member couples to the second actuator in response to the rotation of the lever arm.

9. The lever-actuator of claim 1 wherein
   the cross-member rotates to couple to the second actuator at the actuating slot in response to the rotation of the lever arm.

10. The lever-actuator of claim 1 wherein
    the lever arm has a second end opposite the first end, the second end of the lever arm being free to rotate away from the fiber optic module.

11. The lever-actuator of claim 1 wherein
    the pivoting fastener is perpendicular to the lever arm, and
    the cross-member is perpendicular to the lever arm and parallel to the pivoting fastener.

12. A lever-actuator for fiber optic modules, the lever-actuator comprising:
    a lever arm;
    a pivoting fastener coupled to one end of the lever arm;
    a cross-member coupled to the lever arm, the cross-member including an actuating slot to control a coupling of the cross-member to a second actuator; and
    wherein the lever-actuator rotates to cause the second actuator to disengage a fiber optic module from a cage assembly.

13. The lever actuator of claim 12 wherein
    the actuating slot rotates with the lever arm to cause the second actuator to disengage.

14. The lever-actuator of claim 12 wherein
    the pivoting fastener includes at least one pin to rotationally couple the lever arm to the fiber optic module.

15. The lever-actuator of claim 12 wherein
    the pivoting fastener includes one or more holes to receive one or more pins to rotationally couple the lever arm to the fiber optic module.

16. The lever-actuator of claim 12 further comprising:
    a pull-arm coupled to the lever arm.

17. The lever-actuator of claim 16 wherein,
    the pull-arm is a semi-circular ring.

18. The lever-actuator of claim 16 wherein,
    the pull-arm is a tab.

19. The lever-actuator of claim 16 wherein,
    the pull-arm is a bail-latch.

20. The lever-actuator of claim 12, wherein
    to control the coupling, the actuating slot provides additional clearance between a surface of the second actuator and the cross-member when the lever-actuator is in a closed position.

21. The lever-actuator of claim 20, wherein
    the actuating slot delays a coupling of the cross-member to the second actuator when the lever-actuator is rotated.

22. The lever-actuator of claim 12, wherein
    to control the coupling, the actuating slot has side walls to align the cross-member with sides of the second actuator when the lever-actuator is rotated.

23. The lever-actuator of claim 12, wherein
    to control the coupling, the actuating slot has side walls to laterally constrain the cross-member in alignment with the second actuator.

24. A lever-actuator for fiber optic modules, the lever-actuator comprising:
    a lever arm;
    a pivoting fastener coupled to one end of the lever arm;
    a cross-member coupled to the lever arm and including an actuating slot; and
    a pivot arm actuator to couple to the cross-member in the actuating slot, the pivot arm actuator rotates to disengage a fiber optic module from a cage assembly in response to the cross-member being rotated.

25. The lever-actuator of claim 24 further comprising:
    a bracket coupled to the fiber optic module, the bracket including a flexible arm portion to maintain the pivot arm actuator in an engaged position.

26. The lever-actuator of claim 25 wherein
    the flexible arm portion of the bracket flexes and provides a counteracting force when the pivot arm actuator rotates to disengage.

27. The lever-actuator of claim 24 wherein
    the pivoting fastener includes at least one pin to rotationally couple the lever arm to the fiber optic module.

28. The lever-actuator of claim 24 wherein
    the pivoting fastener includes one or more holes to receive one or more pins to rotationally couple the lever arm to the fiber optic module.

29. The lever-actuator of claim 24 further comprising:
    a pull-arm coupled to the lever arm.

30. The lever-actuator of claim 29 wherein,
    the pull-arm is a semi-circular ring.

31. The lever-actuator of claim 29 wherein,
    the pull-arm is a tab.

32. The lever-actuator of claim 29 wherein,
    the pull-arm is a bail-latch.

33. The lever-actuator of claim 24 wherein
    the cross-member rotates in response to the lever arm being rotated.

34. The lever-actuator of claim 33 wherein
    the pivoting fastener provides an axis around which the lever arm and the cross-member rotate together.

35. The lever-actuator of claim 24 wherein.

the pivot arm actuator has a first end, a second end opposite the first end, and a middle portion between the first end and the second end, the first end of the pivot arm actuator to couple to the cross-member, the middle portion of the pivot arm actuator rotationally coupled to the fiber optic module, the second end of the pivot arm actuator having a releasable triangle.

36. The lever-actuator of claim 35 wherein the releasable triangle of the pivot arm actuator is triangularly shaped to mate with a triangularly shaped opening in the cage assembly.

37. The lever-actuator of claim 35 wherein the middle portion of the pivot arm actuator having a side tab including a pin opening to receive a pin, and the lever actuator further includes a pin inserted in the pin opening and coupled to the fiber optic module.

38. The lever-actuator of claim 35 further comprising:

a bracket coupled to the fiber optic module, the bracket including a flexible arm portion to maintain the pivot arm actuator in an engaged position and a slot opening aligned with the releasable triangle, the releasable triangle to extend out through the slot opening in the engaged position, the pivot arm actuator including a platform to couple to the flexible arm portion of the bracket.

39. The lever-actuator of claim 38 wherein the flexible arm portion of the bracket flexes and provides a counteracting force when the pivot arm actuator rotates to a disengaged position, the releasable triangle to retract back through the slot opening in the disengaged position.

40. The lever-actuator of claim 24 wherein the pivot arm actuator has a first end, a second end opposite the first end, and a middle portion between the first end and the second end, the first end of the pivot arm actuator to couple to the cross-member, the middle portion of the pivot arm actuator rotationally coupled to the fiber optic module, the second end of the pivot arm actuator having a releasable boss.

41. The lever-actuator of claim 40 wherein the releasable boss of the pivot arm actuator is shaped to mate with an opening in the cage assembly.

42. The lever-actuator of claim 40 wherein the middle portion of the pivot arm actuator having a side tab including a pin opening to receive a pin, and the lever actuator further includes a pin inserted in the pin opening and coupled to the fiber optic module.

43. The lever-actuator of claim 40 further comprising:

a bracket coupled to the fiber optic module, the bracket including a flexible arm portion to maintain the pivot arm actuator in an engaged position and a slot opening aligned with the releasable boss, the releasable boss to extend out through the slot opening in an engaged position, the pivot arm actuator including a platform to couple to the flexible arm portion of the bracket.

44. The lever-actuator of claim 43 wherein the flexible arm portion of the bracket flexes and provides a counteracting force when the pivot arm actuator rotates to a disengaged position, the releasable boss to retract back through the slot opening in the disengaged position.

45. The lever-actuator of claim 24 wherein the pivoting fastener is perpendicular to the lever arm, the cross-member is perpendicular to the lever arm and parallel to the pivoting fastener, and the pivot arm actuator is perpendicular to the cross-member and the pivoting fastener and parallel to the lever arm.

46. A lever-actuator for fiber optic modules, the lever-actuator comprising:

a lever arm;

a pivoting fastener coupled perpendicular to one end of the lever arm;

a cross-member coupled perpendicular to the lever arm and parallel to the pivoting fastener, the cross-member including an actuating slot to actuate a second actuator; and wherein the lever-actuator rotates to cause the second actuator to disengage a fiber optic module from a cage assembly.

47. The lever-actuator of claim 46, wherein the actuating slot provides a delay in actuation of the second actuator when the lever-actuator is rotated.

48. The lever-actuator of claim 47, wherein the actuating slot provides additional clearance between a surface of the second actuator and the cross-member when the lever-actuator is in a closed position.

* * * * *